United States Patent
Andersson et al.

(10) Patent No.: US 11,889,054 B2
(45) Date of Patent: *Jan. 30, 2024

(54) METHODS PROVIDING ENCODING AND/OR DECODING OF VIDEO USING REFERENCE VALUES AND RELATED DEVICES

(71) Applicant: Telefonaktiebolaget LM Ericsson (publ), Stockholm (SE)

(72) Inventors: Kenneth Andersson, Gävle (SE); Jack Enhorn, Kista (SE); Rickard Sjöberg, Stockholm (SE); Jacob Ström, Stockholm (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 139 days.

This patent is subject to a terminal disclaimer.

(21) Appl. No.: 16/959,377

(22) PCT Filed: Dec. 14, 2018

(86) PCT No.: PCT/EP2018/084990
§ 371 (c)(1),
(2) Date: Jun. 30, 2020

(87) PCT Pub. No.: WO2019/129509
PCT Pub. Date: Jul. 4, 2019

(65) Prior Publication Data
US 2021/0067770 A1    Mar. 4, 2021

Related U.S. Application Data

(60) Provisional application No. 62/611,852, filed on Dec. 29, 2017.

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/176* (2014.11); *H04N 19/82* (2014.11)

(58) Field of Classification Search
None
See application file for complete search history.

(56) References Cited

U.S. PATENT DOCUMENTS 6,496,605 B1 * 12/2002 Osa .................. H04N 19/86
348/420.1
6,504,873 B1   1/2003 Vehviläinen
(Continued)

FOREIGN PATENT DOCUMENTS

CA    2719540 C * 3/2014 ........... H04N 19/117
CN    10197163 B   10/2013
(Continued)

OTHER PUBLICATIONS

Decision to Grant, including English translation, for Japanese Patent Application No. 2020-534961 dated Oct. 12, 2021, 6 pages.
(Continued)

*Primary Examiner* — Mohammed Jebari
(74) *Attorney, Agent, or Firm* — Sage Patent Group

(57) ABSTRACT

An encoded video sequence including a plurality of images may be decoded. First and second adjacent blocks of an image of an encoded video sequence may be provided. A line of pixels including pixels of the first and second blocks may be defined extending across a boundary between the first and second blocks. A first reference value may be calculated based on a first pixel of the pixels from the first block. A second reference value may be calculated based on a second pixel of the pixels from the second block. Filtered pixel values for each pixel of the line of pixels between the first pixel and the second pixel may be calculated using interpolation based on the first and/or second reference (Continued)

values. Filtered blocks may be generated using the filtered pixel values, and a decoded video sequence may be generated based on the filtered blocks.

20 Claims, 20 Drawing Sheets

(51) Int. Cl.
*H04N 19/176* (2014.01)
*H04N 19/82* (2014.01)

(56) References Cited

U.S. PATENT DOCUMENTS

| | | | |
|---|---|---|---|
| 2003/0152146 A1* | 8/2003 | Lin | H04N 19/18 375/E7.199 |
| 2005/0201633 A1* | 9/2005 | Moon | H04N 19/86 382/268 |
| 2005/0243911 A1* | 11/2005 | Kwon | H04N 19/137 375/240.18 |
| 2005/0243912 A1* | 11/2005 | Kwon | H04N 19/86 375/240.18 |
| 2006/0013315 A1* | 1/2006 | Song | H04N 19/86 375/240.24 |
| 2006/0078055 A1* | 4/2006 | Kanazawa | H04N 19/176 382/268 |
| 2007/0223835 A1* | 9/2007 | Yamada | H04N 19/14 382/268 |
| 2008/0317377 A1* | 12/2008 | Saigo et al. | H04N 21/42202 382/274 |
| 2010/0061649 A1* | 3/2010 | Hou | H04N 19/86 382/268 |
| 2011/0110603 A1* | 5/2011 | Ikai | H04N 19/176 382/260 |
| 2011/0170609 A1 | 7/2011 | Lainema et al. | |
| 2011/0200103 A1* | 8/2011 | Kim | H04N 19/159 375/240.03 |
| 2012/0177301 A1* | 7/2012 | Shin | H04N 19/86 382/266 |
| 2013/0272624 A1* | 10/2013 | Budagavi | H04N 19/172 382/239 |
| 2013/0322548 A1* | 12/2013 | Narroschke et al. | H04N 19/117 375/240.24 |
| 2015/0146795 A1* | 5/2015 | Norkin | H04N 19/182 375/240.24 |
| 2018/0077414 A1* | 3/2018 | Reddy | H04N 19/176 |
| 2018/0103274 A1* | 4/2018 | Zeng | H04N 19/176 |
| 2019/0200016 A1* | 6/2019 | Jang | H04N 19/186 |
| 2019/0313094 A1* | 10/2019 | Kanoh | H04N 19/82 |
| 2020/0014921 A1* | 1/2020 | Ikeda | H04N 19/117 |

FOREIGN PATENT DOCUMENTS

| | | | |
|---|---|---|---|
| EP | 0884911 A1 | 12/1998 | |
| EP | 1039760 A2 * | 9/2000 | H04N 19/86 |
| EP | 1657934 A1 * | 5/2006 | H04N 19/117 |
| EP | 1848219 A1 * | 10/2007 | H04N 19/14 |
| JP | 2005-039766 A | 2/2005 | |

OTHER PUBLICATIONS

Kawamura et al., "Extended deblocking-filter process for large block boundary," Joint Video Exploration Team (JVET) of ITU-T SG 16 WP 3 and ISO/IEC JTC 1/SC 29/WG 11, JVET-C0049_r2, 3rd Meeting: Geneva, CH, May 2016, pp. 1-5.
Indian Examination Report for Indian Application No. 202017022782, dated Aug. 26, 2021, 6 pages.
International Search Report and Written Opinion of the International Searching Authority, PCT/EP2018/084990, dated Apr. 1, 2019,14 pages.
Jani Lainema et al, "Intra picture coding with planar representations", 28$^{th}$ Picture Coding Symposium, Dec. 1, 2010, XP055100091, pp. 198-201.
Andrey Norkin et al: "HEVC Deblocking Filter", IEEE Transactions on Circuits and Systems for Video Technology, Institute of Electrical and Electronics Engineers, US, vol. 22, No. 12, Dec. 1, 2012 (Dec. 1, 2012), pp. 1746-1754, XP011487156., 9 pages.
Shi (USTC) Z et al: "CE12, Subset 1: Report of Deblocking for Large Size Blocks", 6. JCT-VC Meeting; 97. MPEG Meeting; Jul. 14, 2011-Jul. 22, 2011, ; Torino; (Joint Collaborative Team on Video Coding of ISO/IEC JTC1/SC29/WG11 and ITU-T SG.16 ); URL:http://wftp3.itu.int/av-arch/jctvc-site/,, No. JCTVC-F198, Jul. 1, 2011 (Jul. 1, 2011), XP030009221 ,.pp. 1-7.
Kawamura Ket al: "Extended deblocking-filter decision for large block boundary",4. JVET Meeting; Oct. 15, 2016-Oct. 21, 2016; Chengdu; (The Joint Video Exploration Team of ISO/IEC JTC1/SC29/WG11 and ITU-T SG.16 ); URL:http://phenix.int-evry.fr/jvet/,,No. JVET-D0047, Oct. 6, 2016 (Oct. 6, 2016), XP030150276, pp. 1-3.
Sjoberg R et al., "Description of SDR and HDR video coding technology proposal by Ericsson and Nokia". 10. JVET Meeting; Apr. 10, 2018-Apr. 20, 2018; EAM of ISO/I EC JTC1/SC29/WG11 and ITU-T SG.16 ) ; URL: http://phenix.int-evry.fr/jvet/,, No. JVET-J0012-v2, Apr. 13, 2018 (Apr. 13, 2018), XP030151169, Section 2.1.9.1 Super strong deb locking filters and decisions, 32 pages.

* cited by examiner

METHODS PROVIDING ENCODING AND/OR DECODING OF VIDEO USING REFERENCE VALUES AND RELATED DEVICES

TECHNICAL FIELD

The present disclosure relates generally to video processing, and more particularly, video encoding and/or decoding and related methods and devices.

BACKGROUND

A video sequence is a series of images (also referred to as pictures) where each image includes one or more components. Each component can be described as a two-dimensional rectangular array of sample values. An image in a video sequence may include three components; one luma component Y where the sample values are luma values and two chroma components Cb and Cr, where the sample values are chroma values. The dimensions of the chroma components may be smaller than the luma components by a factor of two in each dimension. For example, the size of the luma component of a high definition HD image may be 1920×1080 and the chroma components may each have the dimension of 960×540. Components are sometimes referred to as color components.

A block is one two-dimensional array of samples (also referred to as pixels). In video coding, each component is split into blocks and the coded video bitstream is a series of blocks. In video coding, the image may be split into units that cover a specific area of the image. Each unit includes all blocks that make up that specific area and each block belongs fully to one unit. The macroblock in H.264 and the Coding unit (CU) in High Efficiency Video Coding HEVC are examples of units.

A block can be defined as a two-dimensional array that a transform used in coding is applied to. These blocks may be known as "transform blocks". Alternatively, a block can be defined as a two-dimensional array that a single prediction mode is applied to. These blocks may be known as "prediction blocks". In the present disclosure, the word block is not tied to one of these definitions, but descriptions herein can apply to either definition. Moreover, blocking artifacts may occur at both prediction block boundaries and transform block boundaries.

There are two types of prediction: intra prediction and inter prediction. Inter prediction predicts blocks of the current picture using blocks coming from previous decoded pictures. The previous decoded pictures that are used for prediction are referred to as reference pictures. The location of the referenced block inside the reference picture is indicated using a motion vector (MV). FIG. 1 shows an example of a MV. As shown in the example of FIG. 1, motion vector MV=(3,1), the current prediction block is C, and its best matching block in the reference picture is D.

MVs can point to fractional sample positions to better capture displacement. Those fractional samples may be generated from nearby integer samples using interpolation. In HM, MV can point to ¼th sample, and in JEM (Joint Exploratory Model), MV can point to ¹⁄₁₆th sample.

When encoding an inter block, the encoder may search for a best matching block from the reference pictures. The resulted MV is a hypothesis of motion of the block moving between the current picture and the reference picture.

To reduce overhead of signaling MV, there are two MV prediction tools, i.e. merge and advanced MV prediction (AMVP). Both tools use the fact that MVs inside a picture can be viewed as a stochastic process and there exist correlations among the MVs. When the current block is in merge mode, then one of its neighboring block's MV is fully reused. When the current block is in AMVP mode, then one of its neighboring blocks' MV is treated as a predictor and the resulting MV difference is explicitly signaled. The decoder follows the same MV prediction procedure to reconstruct the MV. After the MV is reconstructed, motion compensation process is invoked to derive the prediction block.

In JEM, there also exist 4×4 sub-blocks of a block that can have different motion information although no partitioning parameters are signalled, e.g. FRUC (Frame Rate Up Conversion), AFFINE, the alternative temporal motion vector prediction (ATMVP) or spatial-temporal motion vector predictor (STMVP).

A residual block includes samples that represents the sample value differences between the samples of the original source blocks and the prediction blocks. The residual block is processed using a spatial transform. The transform coefficients are then quantized according to a quantization parameter (QP) which controls the precision of the quantized coefficients. The quantized coefficients can be referred to as residual coefficients. A high QP would result in low precision of the coefficients and thus low fidelity of the residual block. A decoder then receives the residual coefficients, and applies inverse quantization and inverse transform to derive the residual block.

After blocks have been reconstructed, deblocking is applied to reduce boundaries between coded blocks.

In HEVC and JEM, deblocking is first applied on vertical boundaries and then on horizontal boundaries. The boundaries are either transform block boundaries or prediction block boundaries. To enable parallel friendly deblocking, the deblocking may be performed on an 8×8 sample grid.

A deblocking filter strength parameter (bs) is set for each boundary. If the value of bs is larger than 0, then deblocking may be applied. The larger the boundary strength is, the stronger filtering is applied. First it is checked, if any of the blocks at a boundary between the blocks is an intra coded block then (bs is set to=2), or if both blocks use inter prediction but and they use different reference frames or have significantly different motion vectors or if a residual is coded, then (bs is set to =1). This first check sets a boundary strength (bs) which is larger than 0 to indicate that deblocking should be applied. The larger the boundary strength is the stronger filtering is applied. To reduce/avoid removing natural structures when deblocking, a check that there are not any natural structures on respective sides of the boundary is then applied for luma. In HEVC, gradient calculations are used on respective sides of the boundary using the following inequality: abs(p0−2*p1+p2)+abs(q0−2*q1+q2) <beta, where beta is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that 4 sample part of the boundary. Chroma boundaries may always be filtered if one any of the neighbouring blocks are intra coded.

Some more details on the HEVC deblocking filter for luma as discussed below. In HEVC, a strong or weak filter decision may be determined as follows:
If dpq is less than (β>>2), Abs(p3−p0)+Abs(q0−q3) is less than (β>>3) and Abs(p0−q0) is less than (5*tC+1)>>1, the strong filter is applied. Otherwise, the weak filter is applied. HEVC strong filtering may be performed as follows:

$p0'=\text{Clip3}(p0-2*tC,p0+2*tC,(p2+2*p1+2*p0+2*q0+q1+4)>>3)$ $p1'=\text{Clip3}(p1-2*tC,p1+2*tC,(p2+p1+p0+q0+2)>>2)$ $p2'=\text{Clip3}(p2-2*tC,p2+2*tC,(2*p3+3*p2+p1+p0+q0+4)>>3)$ $q0'=\text{Clip3}(q0-2*tC,q0+2*tC,(p1+2*p0+2*q0+2*q1+q2+4)>>3)$ $q1'=\text{Clip3}(q1-2*tC,q1+2*tC,(p0+q0+q1+q2+2)>>2)$ $q2'=\text{Clip3}(q2-2*tC,q2+2*tC,(p0+q0+q1+3*q2+2*q3+4)>>3)$ In the strong filtering discussed above, p* pixels belong to block P where pixel p0 is the closest pixel to the block boundary with block Q, and q* pixels belong to block Q where q0 is closest to the block boundary with block P as shown below:

$p3 p2 p1 p0 | q0 q1 q2 q3$

HEVC weak filtering may be performed as follows:

$\Delta=(9*(q0-p0)-3*(q1-p1)+8)>>4$

When Abs($\Delta$) is less than tC*10, the following ordered steps apply:
The filtered sample values p0' and q0' are specified as follows:

$\Delta=\text{Clip3}(-tC,tC,\Delta)$ $p0'=\text{Clip1}Y(p0+\Delta)$ $q0'=\text{Clip1}Y(q0-\Delta)$ When dp is less than ($\beta$+($\beta$>>1))>>3, the variable dEp is set equal to 1.
When dq is less than ($\beta$+($\beta$>>1))>>3, the variable dEq is set equal to 1.
When dEp is equal to 1, the filtered sample value p1' is specified as follows:

$\Delta p=\text{Clip3}(-(tC>>1),tC>>1,(((p2+p0+1)>>1)-p1+\Delta)>>1)$ $p1'=\text{Clip1}Y(p1+\Delta p)$ When dEq is equal to 1, the filtered sample value q1' is specified as follows:

$\Delta q=\text{Clip3}(-(tC>>1),tC>>1,(((q2+q0+1)>>1)-q1-\Delta)>>1)$ $q1'=\text{Clip1}Y(q1+\Delta q)$ JCTVC-F198 defines a long deblocking filter that filters 4 samples or 8 samples on each side of the block boundary depending on QP. The filtering is performed by taking the average of 8 or 16 samples for the 4 respective 8 sample filtering. The filter is used to transform blocks larger than 16×16 and where the neighbouring transform block size is larger than 8. The variance of the sub-blocks affected by the filtering should be smaller than a threshold (2 used in the contribution). At most 12 samples are used on one side of the block boundary to reduce/avoid overlap between 4 samples used for filtering on a neighbouring 16×16 block.

Deblocking from H.264 and/or HEVC, however, may fail to sufficiently reduce/remove strong blocking artifacts. One problem with the strong deblocking filter in JCTVC-F198 is that it may have a very strong low pass filter effect for all samples that are filtered. Furthermore, a decision to use the filter may require computation of a variance on 16×16 blocks which may be complex.

SUMMARY

According to some embodiments of inventive concepts, an encoded video sequence including a plurality of images may be decoded, with each image of the plurality of images including a plurality of blocks. First and second blocks of an image of the encoded video sequence may be provided, where the first and second blocks are adjacent blocks of the image. A line of pixels extending across a boundary between the first and second blocks may be defined, where the line of pixels includes a first plurality of pixels of the first block and a second plurality of pixels of the second block. A first reference value may be calculated based on a first pixel from the first plurality of pixels that is most distant from the boundary, and a second reference value may be calculated based on a second pixel from the second plurality of pixels that is most distant from the boundary. Filtered pixel values may be calculated for each pixel of the line of pixels between the first pixel and the second pixel using interpolation based on at least one of the first reference value and the second reference value. First and second filtered blocks corresponding to the first and second blocks may be generated using the filtered pixel values. A decoded video sequence including a decoded image may be generated based on the first and second filtered blocks.

According to some other embodiments of inventive concepts, a video sequence including a plurality of images may be encoded, where each image of the plurality of images includes a plurality of blocks. The video sequence including the plurality of images may be provided, and first and second blocks of an image of the video sequence may be provided, where the first and second blocks are adjacent blocks of the image. A line of pixels extending across a boundary between the first and second blocks may be defined, where the line of pixels includes a first plurality of pixels of the first block and a second plurality of pixels of the second block. A first reference value may be calculated based on a first pixel from the first plurality of pixels that is most distant from the boundary, and a second reference value may be calculated based on a second pixel from the second plurality of pixels that is most distant from the boundary. Filtered pixel values may be calculated for each pixel of the line of pixels between the first pixel and the second pixel using interpolation based on at least one of the first reference value and the second reference value. First and second filtered blocks corresponding to the first and second blocks may be generated using the filtered pixel values, and an encoded video sequence may be generated including an encoded image based on at least one of the first and second filtered blocks.

According to some embodiments disclosed herein, improved deblock filtering may be provided to reduce/remove artifacts while maintaining good image quality.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 5:
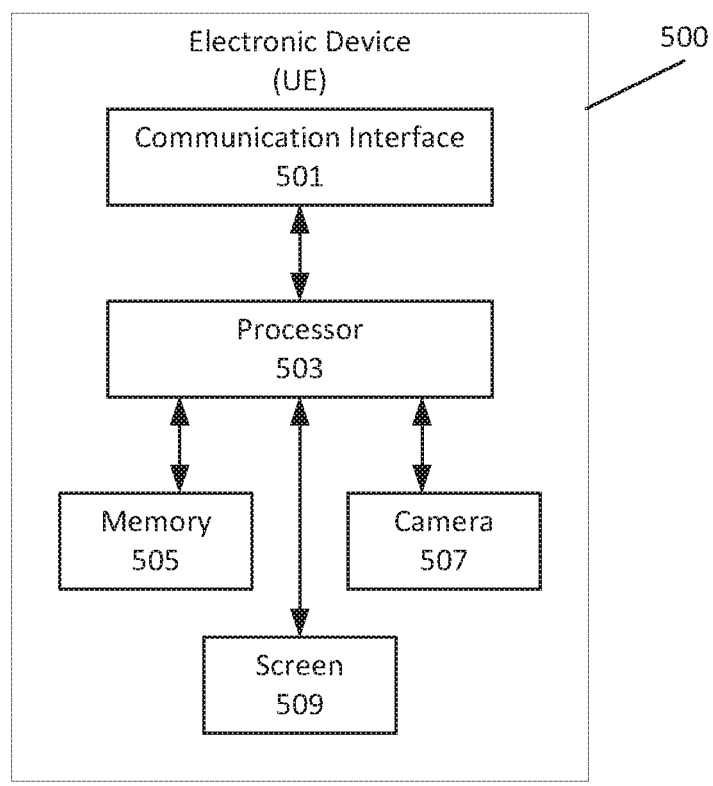
FIG. 5 is a block diagram illustrating an electronic device according to some embodiments of inventive concepts.

FIG. 5 is a block diagram illustrating an electronic device 500 (which may be a wireless device, a 3GPP user equipment or UE device, etc.) according to some embodiments disclosed herein. As shown, electronic device 500 may include processor 503 coupled with communication interface 501, memory 505, camera 507, and screen 509. Communication interface 501 may include one or more of a wired network interface (e.g., an Ethernet interface), a WiFi interface, a cellular radio access network (RAN) interface (also referred to as a RAN transceiver), and/or other wired/wireless network communication interfaces. Electronic device 500 can thus provide wired/wireless communication over one or more wire/radio links with a remote storage system to transmit and/or receive an encoded video sequence. Processor 503 (also referred to as a processor circuit or processing circuitry) may include one or more data processing circuits, such as a general purpose and/or special purpose processor (e.g., microprocessor and/or digital signal processor). Processor 503 may be configured to execute computer program instructions from functional modules in memory 505 (also referred to as a memory circuit or memory circuitry), described below as a computer readable medium, to perform some or all of the operations and methods that are described herein for one or more of the embodiments. Moreover, processor 503 may be defined to include memory so that separate memory 505 may not be required. Electronic device 500 including, communication interface 501, processor 503, and/or camera 507 may thus perform operations, for example, discussed below with respect to the figures and/or Example Embodiments.

According to some embodiments, electronic device 500 (e.g., a smartphone) may generate an encoded video sequence that is either stored in memory 505 and/or transmitted through communication interface 501 over a wired network and/or wireless network to a remoted device. In such embodiments, processor 503 may receive a video sequence from camera 509, and processor may encode the video sequence to provide the encoded video sequence that may be stored in memory 505 and/or transmitted through communication interface 501 to a remote device.

According to some other embodiments, electronic device 500 may decode an encoded video sequence to provide a decoded video sequence that is rendered on display 509 for a user to view. The encoded video sequence may be received from a remote communication device through communication interface 501 and stored in memory 505 before decoding and rendering by processor 503, or the encoded video sequence may be generated by processor 503 responsive to a video sequence received from camera 507 and stored in memory 505 before decoding and rendering by processor 503. Accordingly, the same device may thus encode a video sequence and then decode the video sequence.

Operations of encoding and decoding performed by processor 503 will now be discussed with reference to FIGS. 6 and 7.

Figure 6:
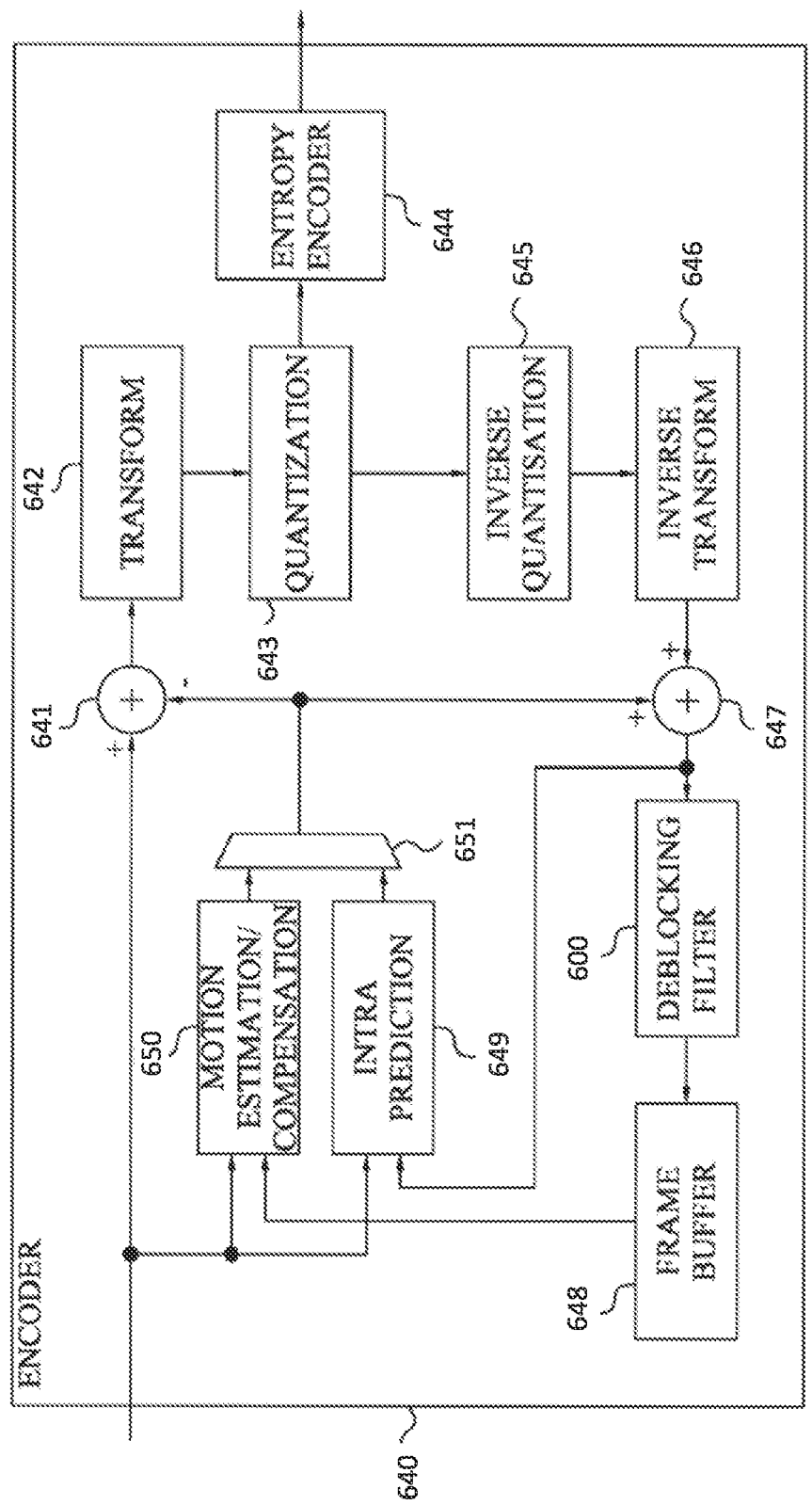
FIG. 6 is a block diagram illustrating encoder operations according to some embodiments of inventive concepts.

FIG. 6 is a schematic block diagram of an encoder 640 which may be implemented by processor 503 to encode a block of pixels in a video image (also referred to as a frame) of a video sequence according to some embodiments of inventive concepts.

A current block of pixels is predicted by performing a motion estimation using motion estimator 650 from an already provided block of pixels in the same frame or in a previous frame. The result of the motion estimation is a motion or displacement vector associated with the reference block, in the case of inter prediction. The motion vector may be used by motion compensator 650 to output an inter prediction of the block of pixels.

Intra predictor 649 computes an intra prediction of the current block of pixels. The outputs from the motion estimator/compensator 650 and the intra predictor 649 are input in selector 651 that either selects intra prediction or inter prediction for the current block of pixels. The output from the selector 651 is input to an error calculator in the form of adder 641 that also receives the pixel values of the current block of pixels. Adder 641 calculates and outputs a residual error as the difference in pixel values between the block of pixels and its prediction.

The error is transformed in transformer 642, such as by a discrete cosine transform, and quantized by quantizer 643 followed by coding in encoder 644, such as by entropy encoder. In inter coding, also the estimated motion vector is brought to encoder 644 to generate the coded representation of the current block of pixels.

The transformed and quantized residual error for the current block of pixels is also provided to an inverse quantizer 645 and inverse transformer 646 to retrieve the original residual error. This error is added by adder 647 to the block prediction output from the motion compensator 650 or intra predictor 649 to create a reference block of pixels that can be used in the prediction and coding of a next block of pixels. This new reference block is first processed by a deblocking filter 600 according to examples/embodiments discussed below to perform deblocking filtering to reduce/combat blocking artifacts. The processed new reference block is then temporarily stored in frame buffer 648, where it is available to intra predictor 649 and motion estimator/compensator 650.

Figure 7:
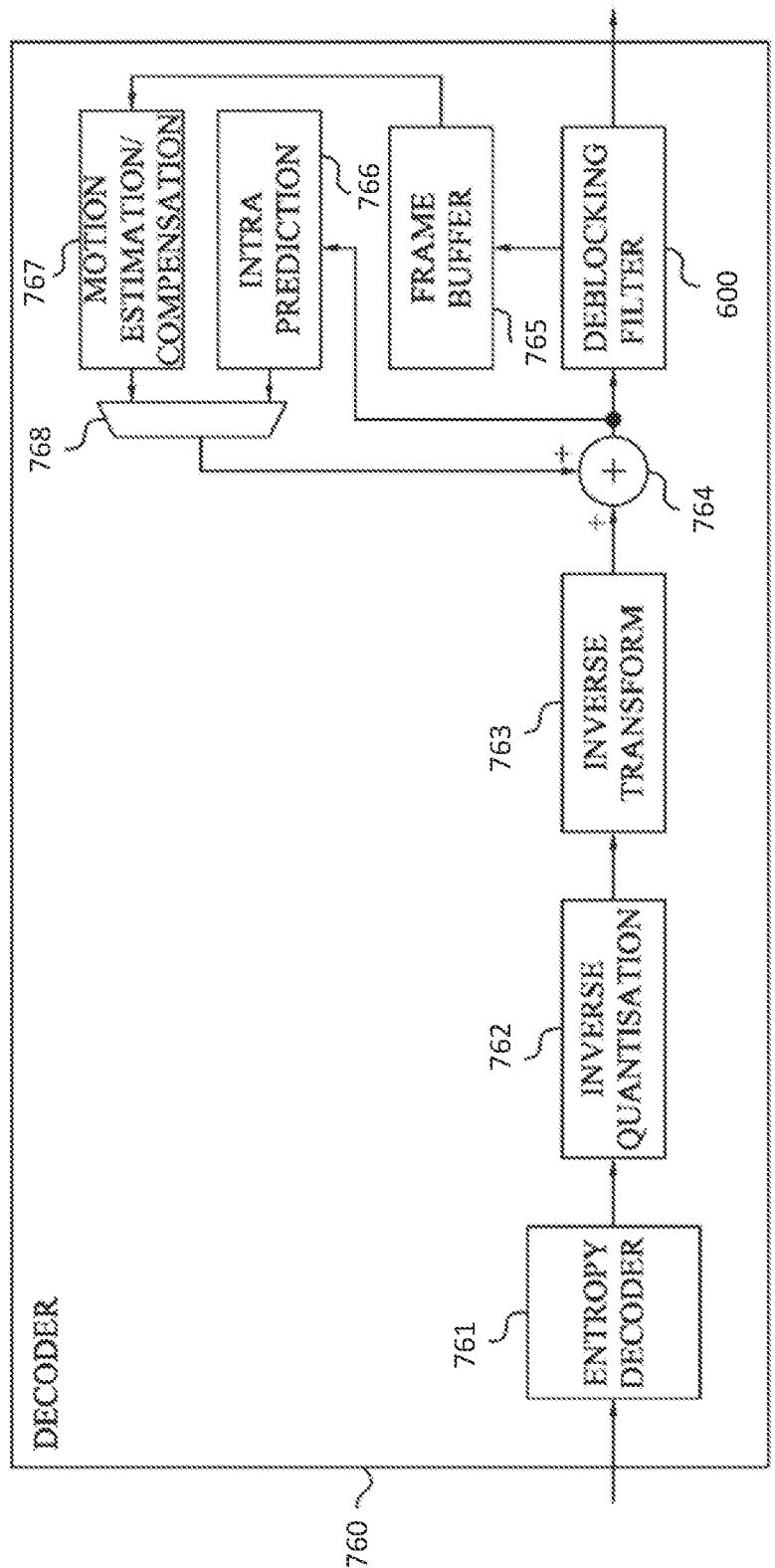
FIG. 7 is a block diagram illustrating decoder operations according to some embodiments of inventive concepts.

FIG. 7 is a corresponding schematic block diagram of decoder 760 including deblocking filter 600 which may be implemented by processor 503 according to some embodiments of inventive concepts. Decoder 760 includes decoder 761, such as entropy decoder, to decode an encoded representation of a block of pixels to get a set of quantized and transformed residual errors. These residual errors are dequantized by inverse quantizer 762 and inverse transformed by inverse transformer 763 to provide a set of residual errors.

These residual errors are added by adder 764 to the pixel values of a reference block of pixels. The reference block is determined by a motion estimator/compensator 767 or intra predictor 766, depending on whether inter or intra prediction is performed. Selector 768 is thereby interconnected to adder 764 and motion estimator/compensator 767 and intra predictor 766. The resulting decoded block of pixels output form adder 764 is input to deblocking filter 600 according to some embodiments of inventive concepts to provide deblocking filtering of blocking artifacts. The filtered block of pixels is output from decoder 760 and may be furthermore temporarily provided to frame buffer 765 to be used as a reference block of pixels for a subsequent block of pixels to be decoded. Frame buffer 765 is thereby connected to motion estimator/compensator 767 to make the stored blocks of pixels available to motion estimator/compensator 767.

The output from adder 764 may also be input to intra predictor 766 to be used as an unfiltered reference block of pixels.

In embodiments of FIGS. 6 and 7, deblocking filter 600 may perform deblocking filtering as so called in-loop filtering. In alternative embodiments at decoder 760, deblocking filter 600 may be arranged to perform so called post-processing filtering. In such a case, deblocking filter 600 operates on the output frames outside of the loop formed by adder 764, frame buffer 765, intra predictor 766, motion estimator/compensator 767, and selector 768. In such embodiments, no deblocking filtering is typically done at the encoder. Operations of deblocking filter 600 will be discussed in greater detail below.

According to some embodiments of inventive concepts, a deblocking filter may reduce blocking artifacts by interpolating boundary samples from a first side of the block boundary to a second side of the block boundary without significant modifications of the low frequency components in the signal (such as a ramp).

For both sides of the block boundary, the interpolation may be performed using a determined sample value at a position further away from the block boundary than the sample furthest away from the block boundary to be filtered to a determined sample value at a position in the middle of all samples to be filtered or at a position in between the boundary samples.

For each side of the block boundary, the interpolation of samples may be performed by interpolation between a weighted average of a first set of sample values centered in the middle of the total samples to be filtered or centered at a position in between the boundary samples and a weighted average of a second set of sample values determined at a position further away than the sample that is furthest away among the samples to be filtered.

Figure 1:
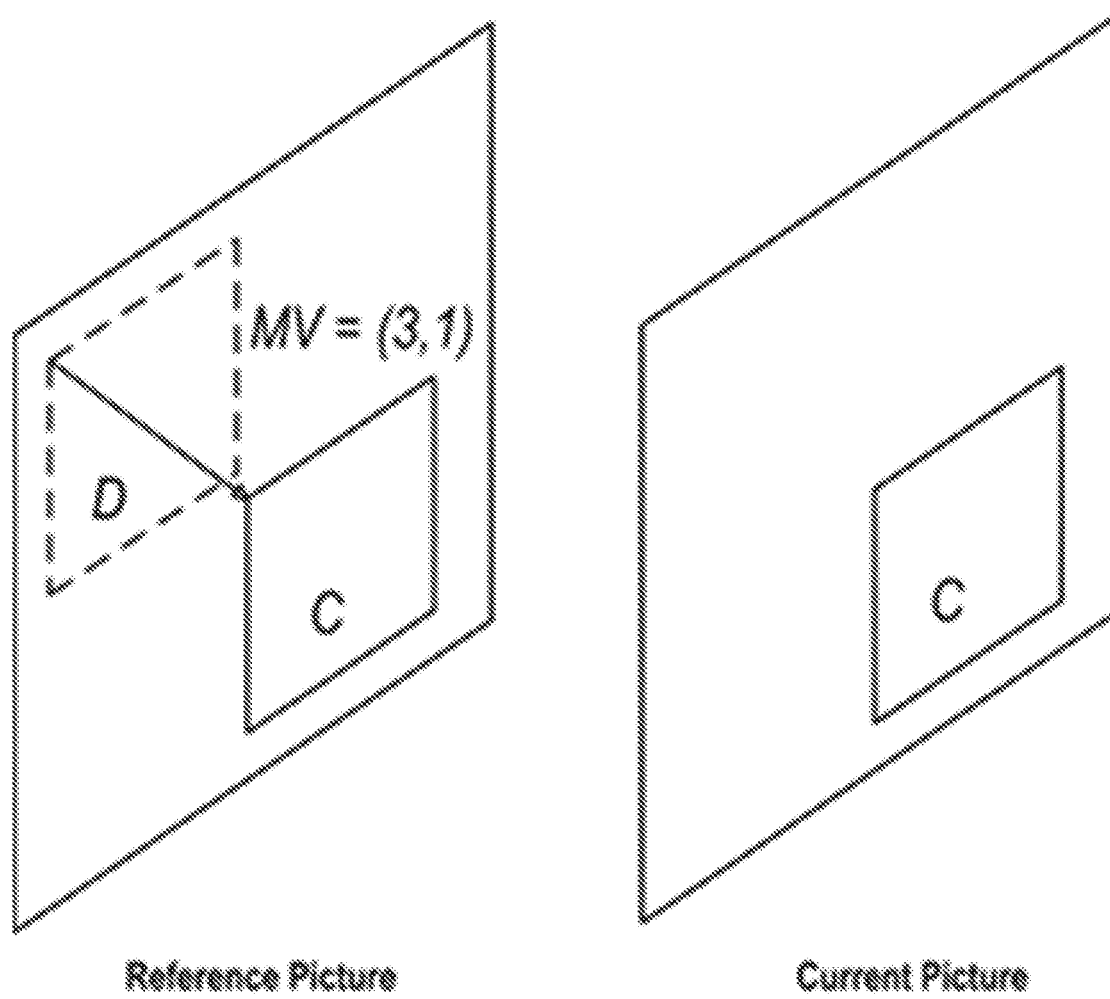
FIG. 1 is a schematic diagram illustrating a reference picture a current picture and a motion vector MV used to predict a block.
Figure 2:
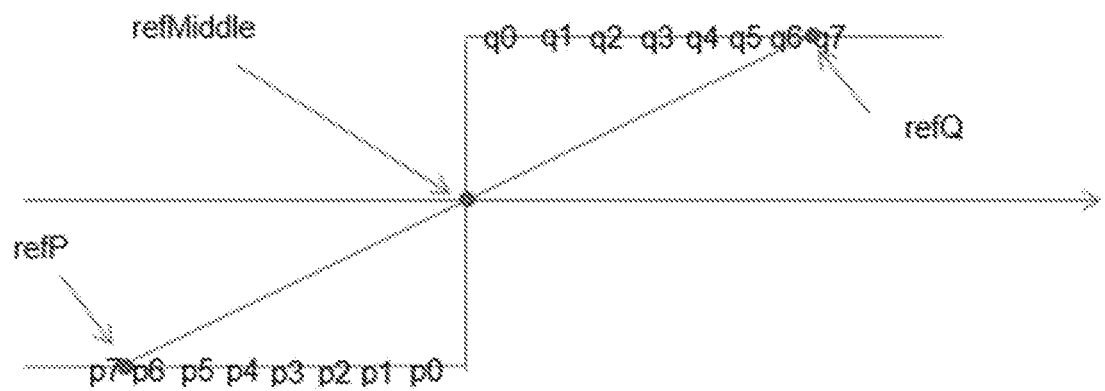
FIG. 2 is a schematic diagram illustrating deblock filtering according to some embodiments of inventive concepts.

FIG. 2 illustrates deblocking using linear interpolation from a determined sample on a first side of the block boundary towards a determined sample on the block boundary and from the determined sample on the block boundary towards a determined sample value on a second side of the block boundary according to some embodiments of inventive concepts.

According to some embodiments of inventive concepts, severe artifacts may be reduced by deblock filtering while maintaining good image quality. Some embodiments of such deblock filtering may be well suited to deblock artifacts from large blocks without significantly increasing complexity.

JCTVC-F198 may require one shift and 16 additions per filtered sample for the case of filtering 8 samples on each side of the boundary. According to some embodiments of inventive concepts for 7 sample filtering on each side, as discussed below with respect to Example 6, deblock filtering may use 14 additions one multiplication and one shift for refMiddle and then four additions and two shifts for refP and refQ in common for 14 sample filtering and then two multiplications and one addition and one shift per filtered sample. So in total, Example 6 may use 2+1/14 multiplications, 1+18/14 additions, 1+3/14 shifts per sample. In comparison with JCTVC-F198, Example 6 may use 14 fewer additions but two more multiplications. Thus, the proposed filter of Example 6 may require a similar number of operations relative to JCTVC-F198. One benefit of the filter of Example 6 compared to JCTVC-F198 is that the filter response provides less low pass the further away from the boundary filtering occurs. A memory bandwidth may also be less since the filter of Example 6 may need to access 16 samples in total to filter 14 samples while the JCTVC-F198 may need to access 32 samples to filter 16 samples.

Deblock filtering according to some embodiments of inventive concepts may be used in both an encoder and a decoder.

Additional decisions to determine the use of the long filters is not the scope of the present disclosure, but it may be recommended to check the smoothness adjacent to a block boundary and only apply the long filters when corresponding samples to filter are smooth on a respective side of a boundary. It may also be recommended to use long filters for boundaries between large blocks.

According to some embodiments of inventive concepts, deblock filtering may use linear interpolation, but higher order interpolation may be used according to additional embodiments of inventive concepts. Various examples of embodiments of inventive concepts are discussed below.

According to a first example, sample values (also referred to as pixel values) are interpolated from a determined sample value at a position in the middle of the samples (also referred to as pixels) to be filtered towards a determined sample value further away from the block boundary.

The position of the determined sample value in the middle of the samples to be filtered is determined in the middle between two samples values if the number of samples to be filtered is even and at the middle sample if the number of samples to be filtered is odd and the determined value is computed by using N samples from respective side of that position.

Typically, the samples to be filtered may lie along a line perpendicular to the block boundary but embodiments of inventive concepts could also be used for a line diagonally over the block boundary to reduce/avoid removing diagonal structures.

Considering samples in a block P (including samples/pixels p) and a block Q (including samples/pixels q), along a line perpendicular to the block boundary as follows:

$$p5p4p3p2p1p0|q0q1q2q3q4q5$$

where p5 to p0 belong to one block P and q0 to q5 belong to another block Q, and where p0 and q0 are closest to the block boundary.

A position in the middle of the samples to be filtered will in this case be between p0 and q0 if a same number of samples are filtered in both block P and block Q (since then the number of samples to be filtered is even). A determined sample value at that position is the computed average of samples perpendicular to the block boundary where at least one sample is taken from respective sides of the block boundary, e.g. at least p0 and q0. One example of a determined sample value is (p0+q0)/2 (i.e., an average of p0 and q0). Another example is (p1+p0+q0+q1)/4 (i.e., an average of p1, p0, q0, and q1). Instead of an unweighted average, a weighted average may be used with different weighting factors on the samples but with the same weighting for samples at the same distance from the position near the boundary, e.g. symmetric weighting.

p1 and q1 are examples of determined sample values perpendicular to the block boundary further away from the block boundary. Those determined sample values are both inside block P and block Q respectively, and they can be denoted refP and refQ. Instead of just picking the sample values p1 and q1 as the determined sample value one can instead take the average of p1 and p0, and the average of q1 and q0 as the determined sample values further away from the block boundary. Instead of an unweighted average, a weighted average can be used with different weighting factors on the samples. By averaging sample values, a more reliable determined sample value can be obtained.

As an example of interpolated samples after deblocking, at least p0 or q0 may be interpolated based on the determined sample near the boundary and the determined sample further away from the boundary inside the block. The interpolation may be linear so that the interpolated sample decreases or increases linearly from the determined sample value in the middle of the samples to be filtered towards the determined sample value further away from the boundary inside respective blocks.

As a numerical example, consider deblocking of 5 samples on side P (p0 to p4) and 5 samples on side Q (q0 to q4):

$$\text{refMiddle}=(p0+q0)/2$$

$$\text{refP}=(p5+p4)/2$$

$$\text{refQ}=(q5+q4)/2$$

A filter to linearly interpolate between refP and refMiddle (similarly between refQ and refMiddle) can then be defined by calculating the distances between the positions of refP and refMiddle. If refP is defined as the average between samples p5 and p4, the distance between refP and p4 is 0.5, and between refP and p3 is 1.5, and between refP and p2 is 2.5, and between refP and p1 is 3.5 and between refP and p0 is 4.5, and finally between refMiddle and p0 is 0.5. Thus the distance between refP and refMiddle is 5 samples in this case.

The filter coefficients f to be applied on refMiddle and 1 minus those coefficients to be applied on refP may be defined to produce filtered values p0' to p4' (here denoted p(x)) by linear interpolation.

$$f=[4.5\;3.5\;2.5\;1.5\;0.5]/5$$

$$p(x)'=f(x)*\text{refMiddle}+(1-f(x))*\text{refP}$$

where x is 0 to 4, and p(x)' is a filtered version of p(x). Accordingly, f(0) is 4.5/5 and f(1) is 3.5/5, etc. Similarly for side Q (q0 to q4 here denoted q(x)):

$$q(x)'=f(x)*\text{refMiddle}+(1-f(x))*\text{refQ}$$

where x is 0 to 4, q(x)' is a filtered version of q(x). Accordingly, f(0) is 4.5/5 and f(1) is 3.5/5 etc.

According to this approach of the first example, a smooth transition from one side of the block boundary to the other side of the block boundary may be provided when there is an abrupt transition from one side of the boundary to the other side of the boundary while providing a relatively small impact on a low frequency signal perpendicular to the block boundary, for example, a linear ramp (1 2 3 4 . . . ).

According to a second example, deblocking of the first example may be implemented using fixed point arithmetic instead of floating point arithmetic by multiplying the filter coefficients with a normalization factor and rounding the result to have integer filter coefficients. For example, the filter of the first example may be written as:

$$f\text{Int}=\text{round}(f*64)=[58\;45\;32\;19\;6]$$

As an example, refMiddle, refP and refQ can be obtained as:

$$\text{refMiddle}=(p4+p3+2*(p2+p1+p0+q0+q1+q2)+q3+q4)+8)>>4$$

$$\text{refP}=(p5+p4+1)>>1$$

$$\text{refQ}=(q5+q4+1)>>1$$

and the filtering can be described as:

$$p(x)=(f\text{Int}(x)*\text{refMiddle}+(64-f\text{Int}(x))*\text{refP}+32)>>6$$

$$q(x)=(f\text{Int}(x)*\text{refMiddle}+(64-f\text{Int}(x))*\text{refQ}+32)>>6$$

In the equations above, >> is a binary shift function equivalent to a division by the indicated power of 2 (e.g., >>4 is division by 16, >>1 is division by 2, >>6 is division by 64, etc.).

According to a third example, the same approach may be applied in a single step filtering by combining the sequential parts of the filter functions into one vector of filter coefficients to be applied directly for a respective reconstructed sample value to produce a filtered output.

refMiddle=[0 1 1 1 1 1 1 1 1 1 1 0]/10 refQ=[0 0 0 0 0 0 0 0 0 0 1 1]/2 refP=[1 1 0 0 0 0 0 0 0 0 0 0]/2

$fP(x)=f(x)*$refMiddle$+(1-f(x))*$refP $fP(0)=4.5/5*$[0 1 1 1 1 1 1 1 1 1 1 0]/10+
$(1-4.5/5)*$[1 1 0 0 0 0 0 0 0 0 0 0]/2=[0.0500 0.1400 0.0900 0.0900 0.0900 0.0900 0.0900 0.0900 0.0900 0.0900 0.0900 0]

$fP(1)=3.5/5*$[0 1 1 1 1 1 1 1 1 1 1 0]/10+
$(1-3.5/5)*$[1 1 0 0 0 0 0 0 0 0 0 0]/2=[0.1500 0.2200 0.0700 0.0700 0.0700 0.0700 0.0700 0.0700 0.0700 0.0700 0.0700 0]

$fP(2)=2.5/5*$[0 1 1 1 1 1 1 1 1 1 1 0]/10+
$(1-2.5/5)*$[1 1 0 0 0 0 0 0 0 0 0 0]/2=[0.2500 0.3000 0.0500 0.0500 0.0500 0.0500 0.0500 0.0500 0.0500 0.0500 0.0500 0]

$fP(3)=1.5/5*$[0 1 1 1 1 1 1 1 1 1 1 0]/10+
$(1-1.5/5)*$[1 1 0 0 0 0 0 0 0 0 0 0]/2=[0.3500 0.3800 0.0300 0.0300 0.0300 0.0300 0.0300 0.0300 0.0300 0.0300 0.0300 0]

$fP(4)=0.5/5*$[0 1 1 1 1 1 1 1 1 1 1 0]/10+
$(1-0.5/5)*$[1 1 0 0 0 0 0 0 0 0 0 0]/2=[0.4500 0.4600 0.0100 0.0100 0.0100 0.0100 0.0100 0.0100 0.0100 0.0100 0.0100 0]

$p(0)'=in*fP(0)'$ where in= $[p5 p4 p3 p2 p1 p0 q0 q1 q2 q3 q4 q5]$ $p(1)'=in*fP(1)'$ $p(2)'=in*fP(2)'$ $p(3)'=in*fP(3)'$ $p(4)'=in*fP(4)'$ $p(5)'=in*fP(5)'$ Similarly for q0' to q5':

$fQ(x)=f(x)*$refMiddle$+(1-f(x))*$refQ $q(0)'=in*fQ(0)'$ where in= $[p5 p4 p3 p2 p1 p0 q0 q1 q2 q3 q4 q5]$ $q(1)'=in*fQ(1)'$ $q(2)'=in*fQ(2)'$ $q(3)'=in*fQ(3)'$ $q(4)'=in*fQ(4)'$ $q(5)'=in*fQ(5)'$ This can also be converted to fixed point filters by scaling the floating point numbers with a scaling factor that is a multiple of 2 and round that to integers as described in other embodiments/examples. Then, when filtering, right shift with a factor that corresponds to the scaling factor.

According to a fourth example, an assymetric deblocking can be defined based on previous embodiments by interpolating more samples in one block than in the other block. An algorithm may be used that is the same as or similar to those discussed above. An example of assymetric deblocking is discussed below where samples p0 to p7 of block P and samples q0 to q3 of block Q are provide in a line across a boundary between blocks P and Q.

$p7 p6 p5 p4 p3 p2 p1 p0 | q0 q1 q2 q3$

In this example, samples p6 to p0 and q0 to q2 are filtered.

In this example, refMiddle is between p2 and p1 since the number of samples to filter is 10 in total and the middle is between p2 and p1.

refMiddle$=(p6+p5+p4+p3+p2+p1+p0+q0+q1+q2)/10$

The sample value further away from the block boundary on side P can be between p6 and p7. The determined sample value, may thus be:

refP$=(p7+p6)/2$

The sample value further away from the block boundary on side Q can be between q2 and q3. The determined sample value, may thus be:

refQ$=(q2+q3)/2$

The distance between refP and refMiddle is 5 which also is the distance between refQ and refMiddle. Thus, a filter to interpolate the samples between refP and refMiddle can be defined as:

$f=[4.5\ 3.5\ 2.5\ 1.5\ 0.5]/5$

It can be noted that this is same filter as described in the first example because 5 samples are filtered on each side of a determined middle sample. A difference is that the middle sample now is inside block P rather than between block P and block Q.

In this case, a pointer to the first sample left of refMiddle that is to be modified can be defined as p* and then each sample on the left side of refMiddle can be described by p*(x) thus:

$p*(x)'=f(x)*$refMiddle$+(1-f(x))*$refP where x is 0 to 4, and p*(x)' is a filtered version of p*(x). Accordingly, f(0) is 4.5/5, f(1) is 3.5/5, etc.

Then, a pointer to the first sample right of refMiddle that is to be modified can be defined as q* and then each filtered sample on the right side of refMiddle by q*(x) thus:

$q*(x)'=f(x)*$refMiddle$+(1-f(x))*$refP where x is 0 to 4, q*(x)' is a filtered version of q*(x). Accordingly, f(0) is 4.5/5, f(1) is 3.5/5, etc.

A case for application of a deblocking filter may be in a vertical or horizontal direction perpendicular to the block boundary. According to a fifth example, embodiments of inventive concepts as described in previous examples can also be used for lines of samples arranged at +/−45 degrees compared to the block boundary with a reference direction at 0 degrees along the block boundary. A difference compared to previous examples is the position of the samples to use for deblocking filtering.

Figure 3:
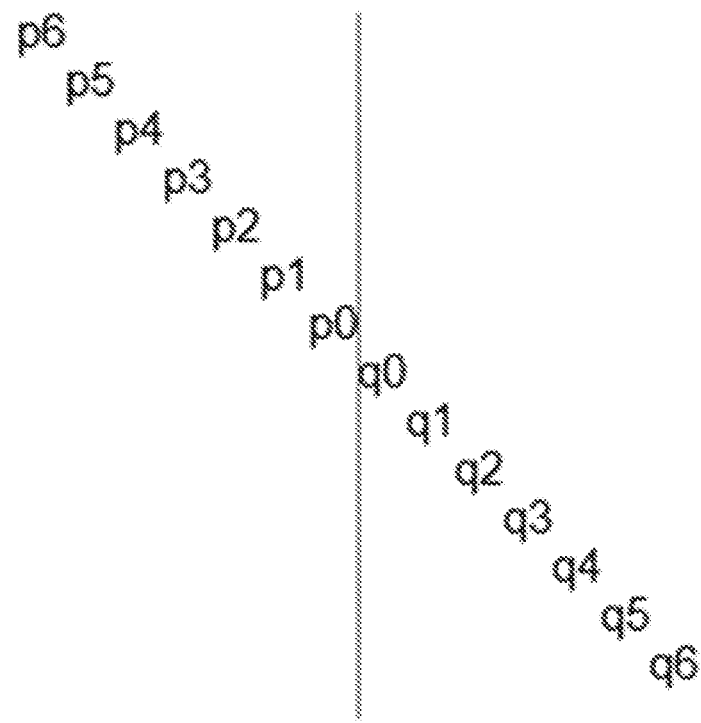
FIGS. 3 and 4 are diagrams illustrating plus and minus 45 degree orientations of samples/pixels used for deblock filtering according to some embodiments of inventive concepts.
Figure 4:
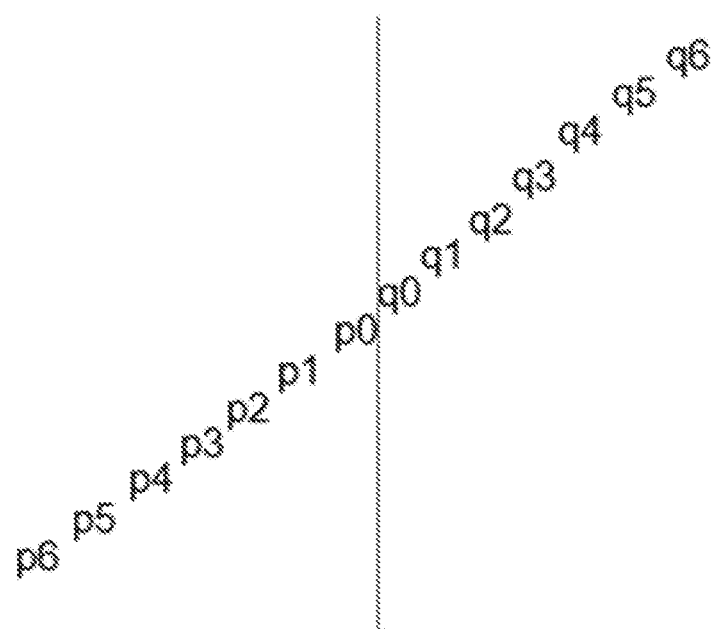

With reference to 5 sample filtering on each side of the block boundary, the samples to use for deblock filtering may be oriented in a line +45 degree counter clock wise compared to the boundary, as shown in FIG. 3. With reference to 5 sample filtering on each side of the block boundary, the samples to use for deblock filtering may be oriented in a line −45 degree counter clock wise compared to the boundary, as shown in FIG. 4.

According to a sixth example, pseudo code may be provided for symmetric deblock filtering by interpolation using 3, 5 or 7 samples on respective side of the block boundary:

```
Int dbCoeffs3[7]={53, 32, 11,0,0,0,0};
Int dbCoeffs5[7]={58, 45, 32,19,6,0,0};
Int dbCoeffs7[7]={59, 50, 41,32,23,14,5};
  switch(numPixToFilter)
  {
  case 3:{
    dbCoeffs = dbCoeffs3;
    refP = (n4+n5+1) >> 1;
    refQ = (n11+n10+1) >> 1;
    refMiddle = (2*n5+3*n6+3*n7+3*n8+3*n9+2*n10+8)>>4;
    }
  case 5:{
    dbCoeffs = dbCoeffs5;
    refP = (n2+n3+1) >> 1;
    refQ = (n13+n12+1) >> 1;
    refMiddle = (n3+n4+2*n5+2*n6+2*n7+2*n8+2*n9+2*n10+n11+n12+8)>>4;
    }
  case 7:{
    dbCoeffs = dbCoeffs7;
    refP = (n0+n1+1)>>1;
    refQ = (n15+n14+1)>>1;
    refMiddle = (n1+n2+n3+n4+n5+n6+2*n7+2*n8+n9+n10+n11+n12+n13+n14+8)>>4;
    }
  }
    // one side (block P)
    for(Int thePos=0; thePos<numPixToFilter; thePos++)
    {
      src = piSrc[-iOffset*(thePos+1)];
      delta = src - ((refMiddle*dbCoeffs[thePos]+refP*(64-dbCoeffs[thePos]) + 32) >>6);
      piSrc[-iOffset*(thePos+1)] = src - Clip3(-tc,tc,delta);
    }
    // other side (block Q)
    for(Int thePos=0; thePos<numPixToFilter; thePos++)
    {
      src = piSrc[iOffset*(thePos)];
      delta = src - ((refMiddle*dbCoeffs[thePos]+refQ*(64-dbCoeffs[thePos]) + 32)>>6);
      piSrc[iOffset*(thePos)] = src - Clip3(-tc,tc,delta);
    }
```

Where the samples n0 to n7 are reconstructed samples on block P and the samples n8 to n15 are reconstructed samples on block Q as shown below:

n0 n1 n2 n3 n4 n5 n6 n7 | n8 n9 n10 n11 n12 n13 n14 n15

The reconstructed samples come from piSrc, where n7=piSrc[-iOffset], n6=piSrc[-2*iOffset], n5=piSrc[-3*iOffset], n4=piSrc[-4*iOffset], n3=piSrc[-5*iOffset], n2=piSrc[-6*iOffset], n1=piSrc[-7*iOffset], n0=piSrc[-8*iOffset], n8=piSrc[0], n9=piSrc[iOffset], n10=piSrc[2*iOffset], n11=piSrc[3*iOffset], n12=piSrc[4*iOffset], n13=piSrc[5*iOffset], n14=piSrc[6*iOffset], n15=piSrc[7*iOffset]

After the filtering piSrc is updated with the filtered output.

According to a seventh example, operations may be similar to examples discussed above but where refMiddle, refP, and refQ are averaged in the direction opposite to the filtering direction to enable more accurate estimates and thus also more robust deblocking.

Consider refMiddle(x), refP(x) and refQ(x) where x goes from 0 to N−1 and where N is the length of the boundary to filter. Based on neighbouring computations of refMiddle, refP and refQ, a weighted average value is determined.

For example, with a weight of 1 for the estimates on neighbouring lines and a weight of 2 for the estimates of the current line of the block boundary.

$$\text{refMiddleAvg}(x) = (\text{refMiddle}(x-1) + \text{refMiddle}(x)*2 + \text{refMiddle}(x+1) + 2) >> 2$$

$$\text{refPAvg}(x) = (\text{refP}(x-1) + \text{refP}(x)*2 + \text{refP}(x+1) + 2) >> 2$$

$$\text{refQAvg}(x) = (\text{refQ}(x-1) + \text{refQ}(x)*2 + \text{refQ}(x+1) + 2) >> 2$$

where refMiddleAvg(x), refPAvg(x) and refQAvg(x) are used instead of refMiddle, refP and refQ in previous embodiments.

According to an eighth example, operations may be similar to examples discussed above but where assymetric deblock filtering is performed by taking the average centered around the middle of the block instead of centered among all samples to be filtered. By way of example, the following samples may be provided across the block boundary:

$$p7\,p6\,p5\,p4\,p3\,p2\,p1\,p0\,|\,q0\,q1\,q2\,q3$$

and p6 to p0 and q0 to q2 are to be filtered.
In this case, refMiddle is between p0 and q0 since the average is centered at the block boundary.

$$\text{refMiddle} = (p2+p1+p0+q0+q1+q2)/6$$

The sample value further away from the block boundary on side P can be between p6 and p7. The determined sample value, refP, may then become:

$$\text{refP} = (p7+p6)/2$$

The sample value further away from the block boundary on side Q can be between q2 and q3. The determined sample value, refQ, then becomes:

$$refQ=(q2+q3)/2$$

The distance between refP and refMiddle is 7. Thus, a filter to interpolate the samples between refP and refMiddle can be defined as:

$$fP=[6.5\ 5.5\ 4.5\ 3.5\ 2.5\ 1.5\ 0.5]/7$$

The distance between refQ and refMiddle is 3. Thus, a filter to interpolate the samples between refP and refMiddle can be defined as:

$$fQ=[2.5\ 1.5\ 0.5]/3$$

$$p(x)'=fP(x)*\text{refMiddle}+(1-fP(x))*\text{refP}$$

where x is 0 to 6, and p(x)' is a filtered version of p(x). Accordingly, fP(0) is 6.5/7, f(1) is 5.5/7, etc.

Similarly for side Q:

$$q(x)'=fQ(x)*\text{refMiddle}+(1-fQ(x))*\text{refQ}$$

where x is 0 to 4, and q(x)' is a filtered version of q(x). Accordingly, fQ(0) is 2.5/3, f(1) is 1.5/3, etc.

In the eighth example, a smooth transition from one side of the block boundary to the other side of the block boundary may be produced when there is an abrupt transition from one side of the boundary to the other side of the boundary while also reducing an impact on a low frequency signal perpendicular to the block boundary, for example, a linear ramp (1 2 3 4 . . . ).

According to a ninth example, operations may be similar to examples discussed above but where refMiddle is omitted to achieve an even stronger deblocking effect. As a numerical example consider deblock filtering of 7 samples on side P and 7 samples on side Q:

$$p7 p6 p5 p4 p3 p2 p1 p0 | q0 q1 q2 q3 q4 q5 q6 q7$$

$$refP=(p7+p6)/2$$

$$refQ=(q7+q6)/2$$

A filter to linearly interpolate between refP and refQ can then be defined by calculating the distances between the positions of refP and refQ. If refP is defined as the average between samples p7 and p6, and refQ is defined as the average between q7 and q6, the distance between refP and p6 is 0.5, and between refP and p5 is 1.5, and between refP and p4 is 2.5, and between refP and p3 is 3.5, etc., and finally between refP and refQ is 14. Thus the distance between refP and refQ is 14 samples in this case.

We can then define the filter coefficients to be applied on refQ and 1 minus those coefficients to be applied on refP to produce filtered values pq0 to pq13 (here denoted pq(x)), where pq0=q7 and pq1=q6 and so fourth and thus pq13=p7, by linear interpolation.

$$f=[13.5\ 12.5\ 11.5\ 10.5\ 9.5\ 8.5\ 7.5\ 6.5\ 5.5\ 4.5\ 3.5\ 2.5\ 1.5\ 0.5]/14$$

$$p(x)'=f(x)*\text{refQ}+(1-f(x))*\text{refP}$$

where x is 0 to 13, p(x)' is a filtered version of p(x). Accordingly, f(0) is 13.5/14, f(1) is 12.5/14, etc.

This can also be converted to fixed point filters by scaling the floating point numbers with a scaling factor that is a multiple of 2 and rounding that to integers as described in other examples. Then when filtering right shift with a factor that corresponds to the scaling factor.

According to a tenth example, operations may be similar to examples discussed above, but to reduce/avoid removing natural structure, the interpolated value may be compared with the value before interpolation and a threshold and the interpolated value may be clipped to a maximum to become equal to or within the range from p(x)−thresholdP(x) to p(x)+thresholdP(x) and q(x)−thresholdQ(x) to q(x)+thresholdQ(x), respectively.

$$pC(x)=p(x)-\text{clip3}(-\text{threshold}(x),\text{threshold}(x),(p(x)-p(x)'))$$

where pC(x) is a clipped version of p(x)', and threshold(x) is based on the QP such that more modification of the samples is allowed when QP is higher (coarser quantization of transform coefficients).

$$qC(x)=q(x)-\text{clip3}(-\text{threshold}Q(x),\text{threshold}Q(x),(q(x)-q(x)'))$$

where qC(x) is a clipped version of q(x)', and thresholdQ(x) is based on the QP such that more modification of the samples is allowed when QP is higher (coarser quantization of transform coefficients).

The thresholdP(x) and the thresholdQ(x) can either all be same or reduced for samples further away from the boundary, e.g., with increasing x.

In some cases, more filtering can be allowed on one side than the other side, for example, if the quantization parameter is lower on one side than the other.

According to some embodiments of inventive concepts, a long deblocking filter may be provided that does not significantly modify a ramp but which may efficiently reduce/remove discontinuities between two blocks. Moreover, such deblocking filters may be implemented with relatively low complexity. According to some embodiments of inventive concepts, deblock filtering may be provided that is relatively flexible with respect to a number of samples to filter and that allows for assymetric deblocking where more samples are filtered on one side of the boundary than the other side.

Operations of electronic device 500 will now be discussed with reference to the flow chart of FIG. 8 according to some embodiments of inventive concepts. For example, modules (also referred to as units) may be stored in memory 505 of FIG. 5, and these modules may provide instructions so that when the instructions of a module are executed by processor 503, processor 503 performs respective operations of the flow chart of FIG. 8.

According to some embodiments of inventive concepts, electronic device 500 may decode an encoded video sequence including a plurality of images, with each image of the plurality of images including a plurality of blocks. At block 801, processor 503 may obtain the encoded video sequence, for example, by receiving the encoded video sequence from a remote source over a network though communication interface 501 and/or by retrieving the encoded video sequence from memory 505. According to some embodiments, processor 503 may first receive the encoded video sequence and then save the encoded video sequence to memory 505 for later retrieval from memory.

At block 803, processor 503 may provide first and second blocks of an image of the encoded video sequence, where the first and second blocks are adjacent blocks of the image. Moreover, the first and second blocks may be provided based on the encoded video sequence obtained at block 801.

At block 805, processor 503 may define a line of pixels extending across a boundary between the first and second blocks, where the line of pixels includes a first plurality of pixels of the first block and a second plurality of pixels of the second block. The first and second pluralities of pixels may include an equal number of pixels, or the first and second pluralities of pixels may include different numbers of pixels. Moreover, the line of pixels may be perpendicular with respect to the boundary, or the line of pixels may be diagonal with respect to the boundary.

At block 807, processor 503 may calculate a first reference value based on a first pixel from the first plurality of pixels that is most distant from the boundary, and at block 809, processor 503 may calculate a second reference value based on a second pixel from the second plurality of pixels that is most distant from the boundary. At block 807, processor 503 may calculate the first reference value as an average based on a value of the first pixel and a value of a pixel of the line adjacent the first pixel, and at block 809, processor 503 may calculate the second reference value as an average based on a value of the second pixel and a value of a pixel of the line adjacent the second pixel.

At block 811, processor 503 may calculate a third reference value based on a third pixel and a fourth pixel from the line of pixels, where the third pixel is in the line between the first pixel and the fourth pixel, and where the fourth pixel is in the line between the third pixel and the second pixel.

At block 813, processor 503 may calculate filtered pixel values for each pixel of the line of pixels between the first pixel and the second pixel using interpolation based on at least one of the first reference value and the second reference value. Provided that the third reference value is used, calculating the filtered pixel values may include calculating filtered pixel values using interpolation based on the first reference value and the third reference value for pixels in the line between the first pixel and the third pixel, and calculating filtered pixel values using interpolation based on the second reference value and the third reference value for pixels in the line between the second pixel and the fourth pixel. According to some embodiments, calculating the filtered pixel values using interpolation at block 813 may also include clipping at least one of the filtered pixel values based on an unfiltered value of the respective pixel and a threshold.

At block 815, processor 503 may generate first and second filtered blocks corresponding to the first and second blocks using the filtered pixel values.

At block 817, processor 503 may generate a decoded video sequence including a decoded image based on the first and second filtered blocks.

At block 819, processor 502 may render the decoded video sequence for display on screen 509, where rendering may include presenting the video on the screen based on the decoded video sequence.

If the third reference value of block 811 is used, calculating the third reference value may include calculating the third reference value as an average based on a value of the third pixel and a value of the fourth pixel. The third pixel may be included in the first plurality of pixels of the first block while the fourth pixel is included in the second plurality of pixels of the second block, or the third and fourth pixels may be included in the first plurality of pixels of the first block. According to some embodiments, processor 503 may calculate the third reference value based on the third and fourth pixels, based on another pixel adjacent to the third pixel and outside the line of pixels, and based on another pixel adjacent to the fourth pixel and outside the line of pixels.

According to some other embodiments, calculating the filtered pixel values at block 813 may include calculating filtered pixel values using interpolation based on the first reference value and the second reference value for pixels in the line between the first pixel and the second pixel. According to such embodiments, the calculation of the third reference value at block 811 may be omitted, and the filtered pixel values may be calculated at block 813 without the third reference value.

According to some embodiments, processor 503 may calculate the first reference value at block 807 based on the first pixel and based on another pixel in the first block adjacent to the first pixel and outside the line of pixels, and processor 503 may calculate the second reference value at block 809 based on the second pixel and based on another pixel in the second block adjacent to the second pixel and outside the line of pixels.

Figure 8:
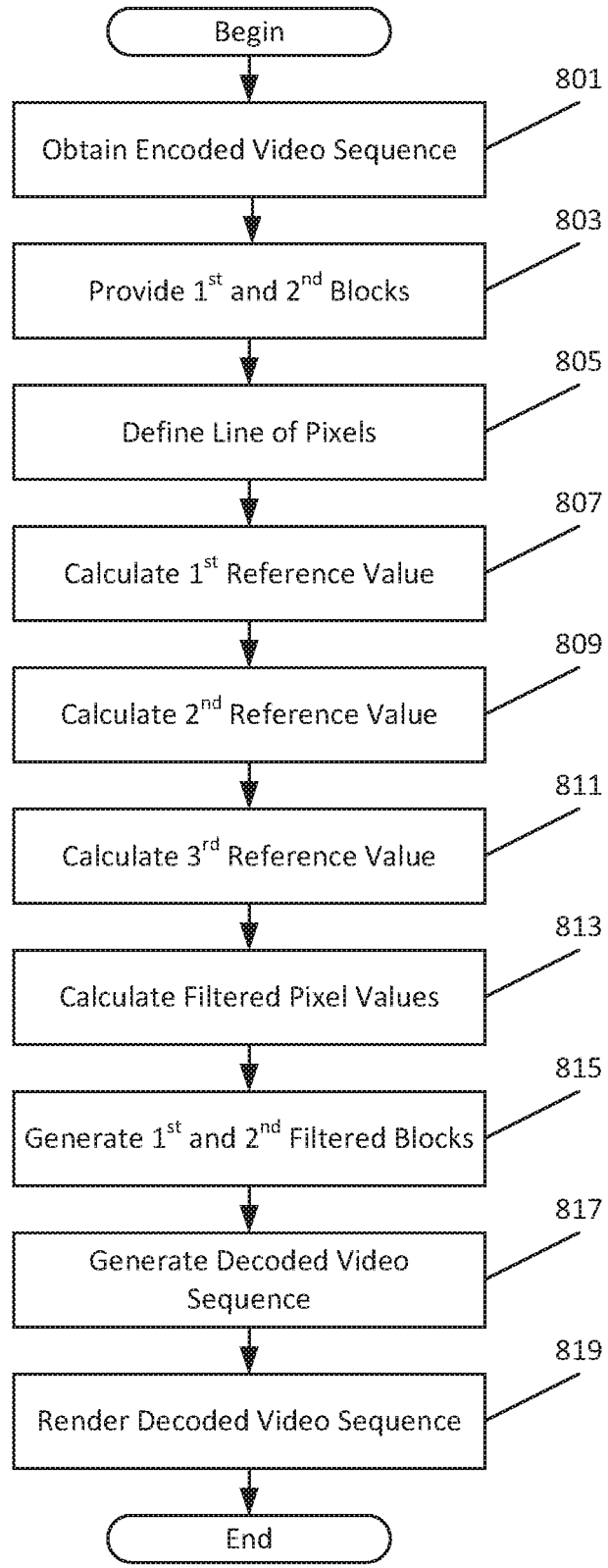
FIGS. 8 and 9 are flow charts illustrating operations of the electronic device of FIG. 5 according to some embodiments of inventive concepts.

Various operations of FIG. 8 may be optional with respect to some embodiments. Regarding methods of example embodiment 1 (set forth below), for example, operations of blocks 801, 811, and 819 of FIG. 8 may be optional.

Operations of electronic device 500 will now be discussed with reference to the flow chart of FIG. 9 according to some embodiments of inventive concepts. For example, modules (also referred to as units) may be stored in memory 505 of FIG. 5, and these modules may provide instructions so that when the instructions of a module are executed by processor 503, processor 503 performs respective operations of the flow chart of FIG. 9.

According to some embodiments of inventive concepts, electronic device 500 may encode a video sequence including a plurality of images, with each image of the plurality of images including a plurality of blocks. At block 901, processor 503 may receive the video sequence including the plurality of images. For example, processor 503 may receiving the video sequence from a video image capture device, such as camera 507 (which may be integrated with electronic device 500 as shown in FIG. 5 or provided external to electronic device 500).

At block 903, processor 503 may provide first and second blocks of an image of the video sequence, with the first and second blocks being adjacent blocks of the image.

At block 905, processor 503 may define a line of pixels extending across a boundary between the first and second blocks, with the line of pixels including a first plurality of pixels of the first block and a second plurality of pixels of the second block. The first and second pluralities of pixels may include an equal number of pixels, or the first and second pluralities of pixels include different numbers of pixels. Moreover, the line of pixels may be perpendicular with respect to the boundary, or the line of pixels may be diagonal with respect to the boundary.

At block 907, processor 503 may calculate a first reference value based on a first pixel from the first plurality of pixels that is most distant from the boundary, and at block 909, processor 503 may calculate a second reference value based on a second pixel from the second plurality of pixels that is most distant from the boundary.

At block 911, processor 503 may calculate a third reference value based on a third pixel and a fourth pixel from the line of pixels, where the third pixel is in the line between the first pixel and the fourth pixel, and where the fourth pixel is in the line between the third pixel and the second pixel.

At bock 913, processor 503 may calculate filtered pixel values for each pixel of the line of pixels between the first pixel and the second pixel using interpolation based on at least one of the first reference value and the second reference value. Provided that the third reference value is used, calculating the filtered pixel values may include calculating filtered pixel values using interpolation based on the first reference value and the third reference value for pixels in the line between the first pixel and the third pixel, and calculating filtered pixel values using interpolation based on the second reference value and the third reference value for pixels in the line between the second pixel and the fourth pixel.

At block 915, processor 503 may generate first and second filtered blocks corresponding to the first and second blocks using the filtered pixel values.

At block 917, processor 503 may generate an encoded video sequence including an encoded image based on at least one of the first and second filtered blocks.

At block 919, processor 503 may save the encoded video sequence to memory 505, and/or at block 921, processor 503 may transmit the encoded video sequence over a network to a remote device. In addition, processor 503 may save the encoded video sequence to memory 505, decode the encoded video sequence from memory as discussed above with respect to FIG. 8, and then render the decoded video sequence for display on screen 509.

If the third reference value use used, processor 503 may calculate the third reference value at block 911 as an average based on a value of the third pixel (p0) and a value of the fourth pixel (q0). The third pixel may be included in the first plurality of pixels of the first block while the fourth pixel is included in the second plurality of pixels of the second block, or the third and fourth pixels may be included in the first plurality of pixels of the first block. According to some embodiments, processor 503 may calculate the third reference value based on the third and fourth pixels, based on another pixel adjacent to the third pixel and outside the line of pixels, and based on another pixel adjacent to the fourth pixel and outside the line of pixels.

According to some other embodiments, processor 503 may calculate the filtered pixel values using interpolation at block 913 based on the first reference value and the second reference value for pixels in the line between the first pixel and the second pixel. According to such embodiments, the calculation of the third reference value at block 911 may be omitted, and the filtered pixel values may be calculated at block 913 without the third reference value.

At block 907, processor 503 may calculate the first reference value as an average based on a value of the first pixel and a value of a pixel of the line adjacent the first pixel, and at block 909, processor 503 may calculate the second reference value an average based on a value of the second pixel and a value of a pixel of the line adjacent the second pixel.

At block 907, processor 503 may calculate the first reference value based on the first pixel and based on another pixel in the first block adjacent to the first pixel and outside the line of pixels, and at block 909, processor 503 may calculate the second reference value based on the second pixel and based on another pixel in the second block adjacent to the second pixel and outside the line of pixels.

At block 913, processor 503 may calculate the filtered pixel values using interpolation and clipping at least one of the filtered pixel values based on an unfiltered value of the respective pixel and a threshold.

Figure 9:
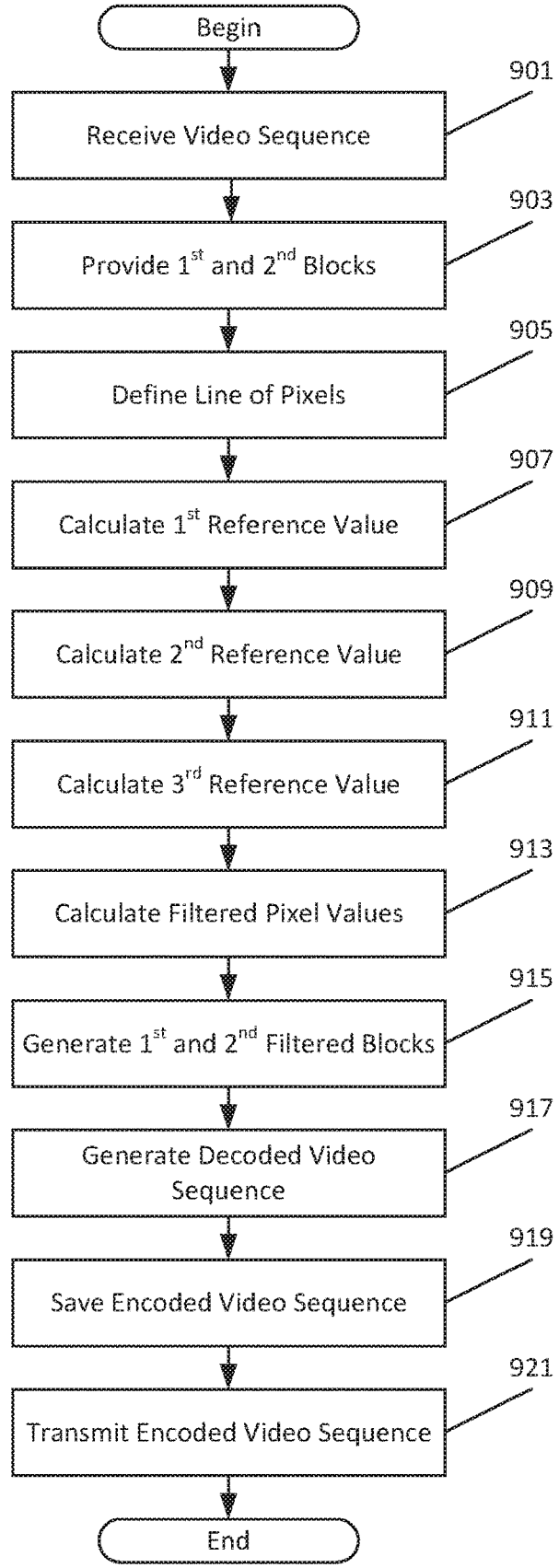

Various operations of FIG. 9 may be optional with respect to some embodiments. Regarding methods of example embodiment 19 (set forth below), for example, operations of blocks 911, 919, and 921 of FIG. 9 may be optional.

Example Embodiments are discussed below. Reference numbers/letters are provided in parenthesis by way of example/illustration without limiting example embodiments to particular elements indicated by reference numbers/letters.

1. A method of decoding an encoded video sequence including a plurality of images, with each image of the plurality of images including a plurality of blocks, the method comprising: providing (803) first and second blocks of an image of the encoded video sequence, wherein the first and second blocks are adjacent blocks of the image; defining (805) a line of pixels (p0 to p7, q0 to q7) extending across a boundary between the first and second blocks wherein the line of pixels includes a first plurality of pixels (p0-p7) of the first block and a second plurality of pixels (q0-q7) of the second block; calculating (807) a first reference value (refP) based on a first pixel (p7) from the first plurality of pixels that is most distant from the boundary; calculating (809) a second reference value (refQ) based on a second pixel (q7) from the second plurality of pixels that is most distant from the boundary; calculating (813) filtered pixel values (p0' to p6', q0' to q6') for each pixel of the line of pixels between the first pixel (p7) and the second pixel (q7) using interpolation based on at least one of the first reference value (refP) and the second reference value (refQ); generating (815) first and second filtered blocks corresponding to the first and second blocks using the filtered pixel values (p0' to p6', q0' to q6'); and generating (817) a decoded video sequence including a decoded image based on the first and second filtered blocks.

2. The method of Embodiment 1 further comprising: rendering (819) the decoded video sequence for display on a screen (509).

3. The method of any of Embodiments 1-2, further comprising: calculating (811) a third reference value (refMiddle) based on a third pixel (p0) and a fourth pixel (q0) from the line of pixels (p0 to p7, q0 to q7), wherein the third pixel (p0) is in the line between the first pixel (p7) and the fourth pixel (q0), and wherein the fourth pixel (q0) is in the line between the third pixel (p0) and the second pixel (q7); wherein calculating the filtered pixel values comprises calculating filtered pixel values using interpolation based on the first reference value (refP) and the third reference value (refMiddle) for pixels in the line between the first pixel (p7) and the third pixel (p0), and calculating filtered pixel values using interpolation based on the second reference value (refQ) and the third reference value (refMiddle) for pixels in the line between the second pixel (q7) and the fourth pixel (q0).

4. The method of Embodiment 3, wherein calculating the third reference value (refMiddle) comprises calculating the third reference value as an average based on a value of the third pixel (p0) and a value of the fourth pixel (q0).

5. The method of any of Embodiments 3-4, wherein the third pixel is included in the first plurality of pixels of the first block, and wherein the fourth pixel is included in the second plurality of pixels of the second block.

6. The method of any of Embodiments 3-4, wherein the third and fourth pixels are included in the first plurality of pixels of the first block.

7. The method of any of Embodiments 1-2, wherein calculating the filtered pixel values comprises calculating filtered pixel values using interpolation based on the first reference value (refP) and the second reference value (refQ) for pixels in the line between the first pixel (p7) and the second pixel (q7).
8. The method of any of Embodiments 1-7, wherein the first and second pluralities of pixels include an equal number of pixels.
9. The method of any of Embodiments 1-7, wherein the first and second pluralities of pixels include different numbers of pixels.
10. The method of any of Embodiments 1-9, wherein the line of pixels is perpendicular with respect to the boundary, or wherein the line of pixels is diagonal with respect to the boundary.
11. The method of any of Embodiments 1-10, wherein calculating the first reference value comprises calculating the first reference value (refP) as an average based on a value of the first pixel (p7) and a value of a pixel (p6) of the line adjacent the first pixel (p7), and wherein calculating the second reference value (refQ) comprises calculating the second reference value as an average based on a value of the second pixel (q7) and a value of a pixel (q6) of the line adjacent the second pixel (q7).
12. The method of any of Embodiments 1-11, further comprising: receiving (801) the encoded video sequence from a remote source over a network, wherein providing the first and second blocks comprises providing the first and second blocks based on the encoded video sequence received from the remote source.
13. The method of any of Embodiments 1-11, further comprising: retrieving (801) the encoded video sequence from memory, wherein providing the first and second blocks comprises providing the first and second blocks based on the encoded video sequence retrieved from memory (505).
14. The method of any of Embodiments 3-6, wherein calculating the third reference value comprises calculating the third reference value based on the third and fourth pixels, based on another pixel adjacent to the third pixel and outside the line of pixels, and based on another pixel adjacent to the fourth pixel and outside the line of pixels.
15. The method of any of Embodiments 1-14, wherein calculating the first reference value comprises calculating the first reference value based on the first pixel and based on another pixel in the first block adjacent to the first pixel and outside the line of pixels, and wherein calculating the second reference value comprises calculating the second reference value based on the second pixel and based on another pixel in the second block adjacent to the second pixel and outside the line of pixels.
16. The method of any of Embodiments 1-15, wherein calculating the filtered pixel values using interpolation comprises clipping at least one of the filtered pixel values based on an unfiltered value of the respective pixel and a threshold.
17. An electronic device (500) adapted to perform operations according to any of Embodiments 1-16.
18. An electronic device (500) comprising: a processor (503) configured to perform operations according to any of Embodiments 1-16.
19. A method of encoding a video sequence including a plurality of images, with each image of the plurality of images including a plurality of blocks, the method comprising: receiving (901) the video sequence including the plurality of images; providing (903) first and second blocks of an image of the video sequence, wherein the first and second blocks are adjacent blocks of the image; defining (905) a line of pixels (p0 to p7, q0 to q7) extending across a boundary between the first and second blocks wherein the line of pixels includes a first plurality of pixels (p0-p7) of the first block and a second plurality of pixels (q0-q7) of the second block; calculating (907) a first reference value (refP) based on a first pixel (p7) from the first plurality of pixels that is most distant from the boundary; calculating (909) a second reference value (refQ) based on a second pixel (q7) from the second plurality of pixels that is most distant from the boundary; calculating (913) filtered pixel values (p0' to p6', q0' to q6') for each pixel of the line of pixels between the first pixel (p7) and the second pixel (q7) using interpolation based on at least one of the first reference value (refP) and the second reference value (refQ); generating (915) first and second filtered blocks corresponding to the first and second blocks using the filtered pixel values (p0' to p6', q0' to q6'); and generating (917) an encoded video sequence including an encoded image based on at least one of the first and second filtered blocks.
20. The method of Embodiment 19, further comprising: calculating (911) a third reference value (refMiddle) based on a third pixel (p0) and a fourth pixel (q0) from the line of pixels (p0 to p7, q0 to q7), wherein the third pixel (p0) is in the line between the first pixel (p7) and the fourth pixel (q0), and wherein the fourth pixel (q0) is in the line between the third pixel (p0) and the second pixel (q7); wherein calculating the filtered pixel values comprises calculating filtered pixel values using interpolation based on the first reference value (refP) and the third reference value (refMiddle) for pixels in the line between the first pixel (p7) and the third pixel (p0), and calculating filtered pixel values using interpolation based on the second reference value (refQ) and the third reference value (refMiddle) for pixels in the line between the second pixel (q7) and the fourth pixel (q0).
21. The method of Embodiment 20, wherein calculating the third reference value (refMiddle) comprises calculating the third reference value as an average based on a value of the third pixel (p0) and a value of the fourth pixel (q0).
22. The method of any of Embodiments 20-21, wherein the third pixel is included in the first plurality of pixels of the first block, and wherein the fourth pixel is included in the second plurality of pixels of the second block.
23. The method of any of Embodiments 20-21, wherein the third and fourth pixels are included in the first plurality of pixels of the first block.
24. The method of Embodiment 19, wherein calculating the filtered pixel values comprises calculating filtered pixel values using interpolation based on the first reference value (refP) and the second reference value (refQ) for pixels in the line between the first pixel (p7) and the second pixel (q7).
25. The method of any of Embodiments 19-24, wherein the first and second pluralities of pixels include an equal number of pixels.
26. The method of any of Embodiments 19-24, wherein the first and second pluralities of pixels include different numbers of pixels.
27. The method of any of Embodiments 19-26, wherein the line of pixels is perpendicular with respect to the boundary, or wherein the line of pixels is diagonal with respect to the boundary.

28. The method of any of Embodiments 19-27, wherein calculating the first reference value comprises calculating the first reference value (refP) as an average based on a value of the first pixel (p7) and a value of a pixel (p6) of the line adjacent the first pixel (p7), and wherein calculating the second reference value (refQ) comprises calculating the second reference value as an average based on a value of the second pixel (q7) and a value of a pixel (q6) of the line adjacent the second pixel (q7).
29. The method of any of Embodiments 19-28, further comprising: saving (919) the encoded video sequence to memory (505).
30. The method of any of Embodiments 19-29, further comprising: transmitting (921) the encoded video sequence over a network to a remote device.
31. The method of any of Embodiments 19-30, wherein receiving the video sequence comprises receiving the video sequence from a video image capture device.
32. The method of any of Embodiments 20-23, wherein calculating the third reference value comprises calculating the third reference value based on the third and fourth pixels, based on another pixel adjacent to the third pixel and outside the line of pixels, and based on another pixel adjacent to the fourth pixel and outside the line of pixels.
33. The method of any of Embodiments 19-32, wherein calculating the first reference value comprises calculating the first reference value based on the first pixel and based on another pixel in the first block adjacent to the first pixel and outside the line of pixels, and wherein calculating the second reference value comprises calculating the second reference value based on the second pixel and based on another pixel in the second block adjacent to the second pixel and outside the line of pixels.
34. The method of any of Embodiments 19-33, wherein calculating the filtered pixel values using interpolation comprises clipping at least one of the filtered pixel values based on an unfiltered value of the respective pixel and a threshold.
35. An electronic device (500) adapted to perform operations according to any of Embodiments 19-34.
36. An electronic device (500) comprising: a processor (503) configured to perform operations according to any of Embodiments 19-34.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
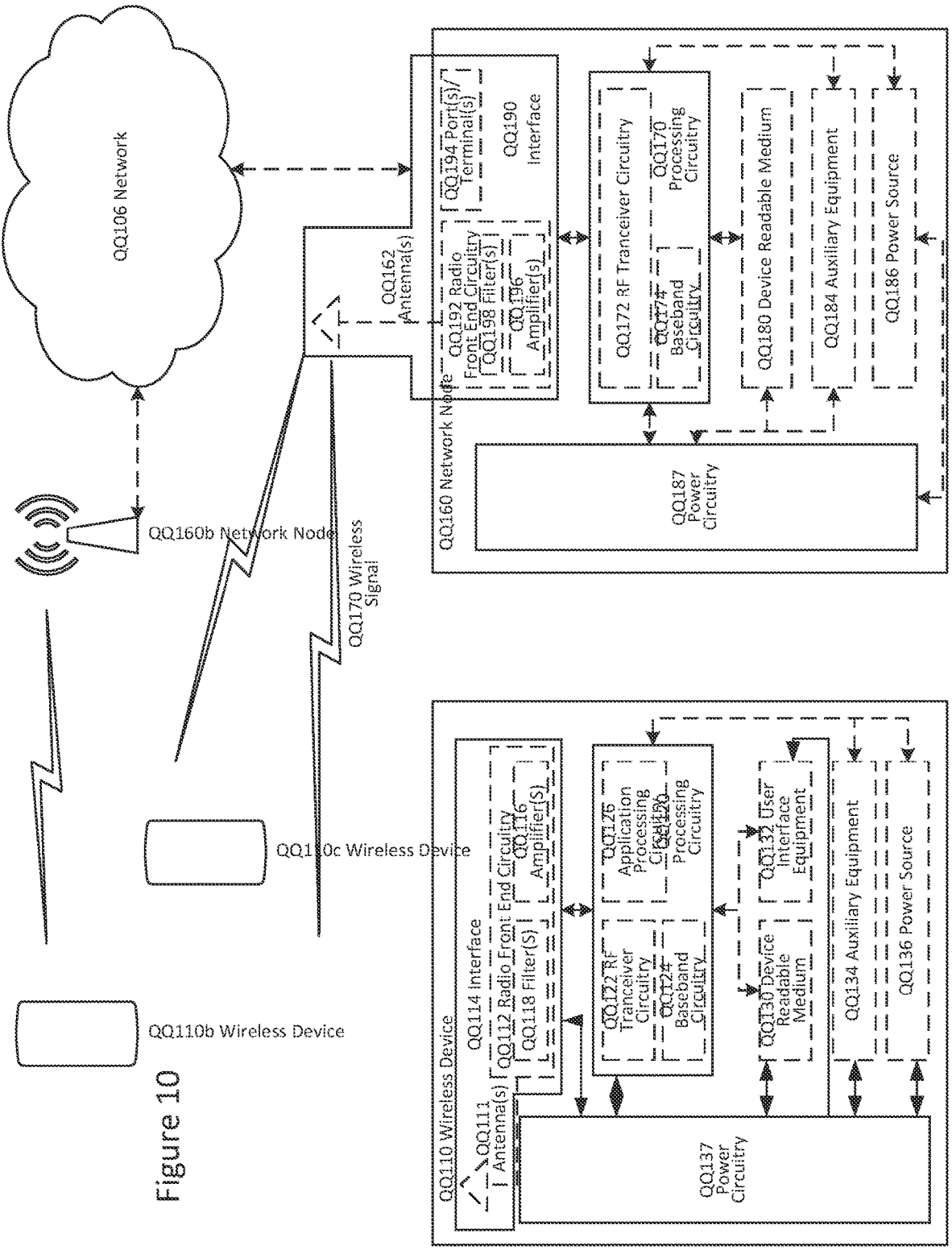
FIG. 10 is a block diagram of a wireless network in accordance with some embodiments.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 11:
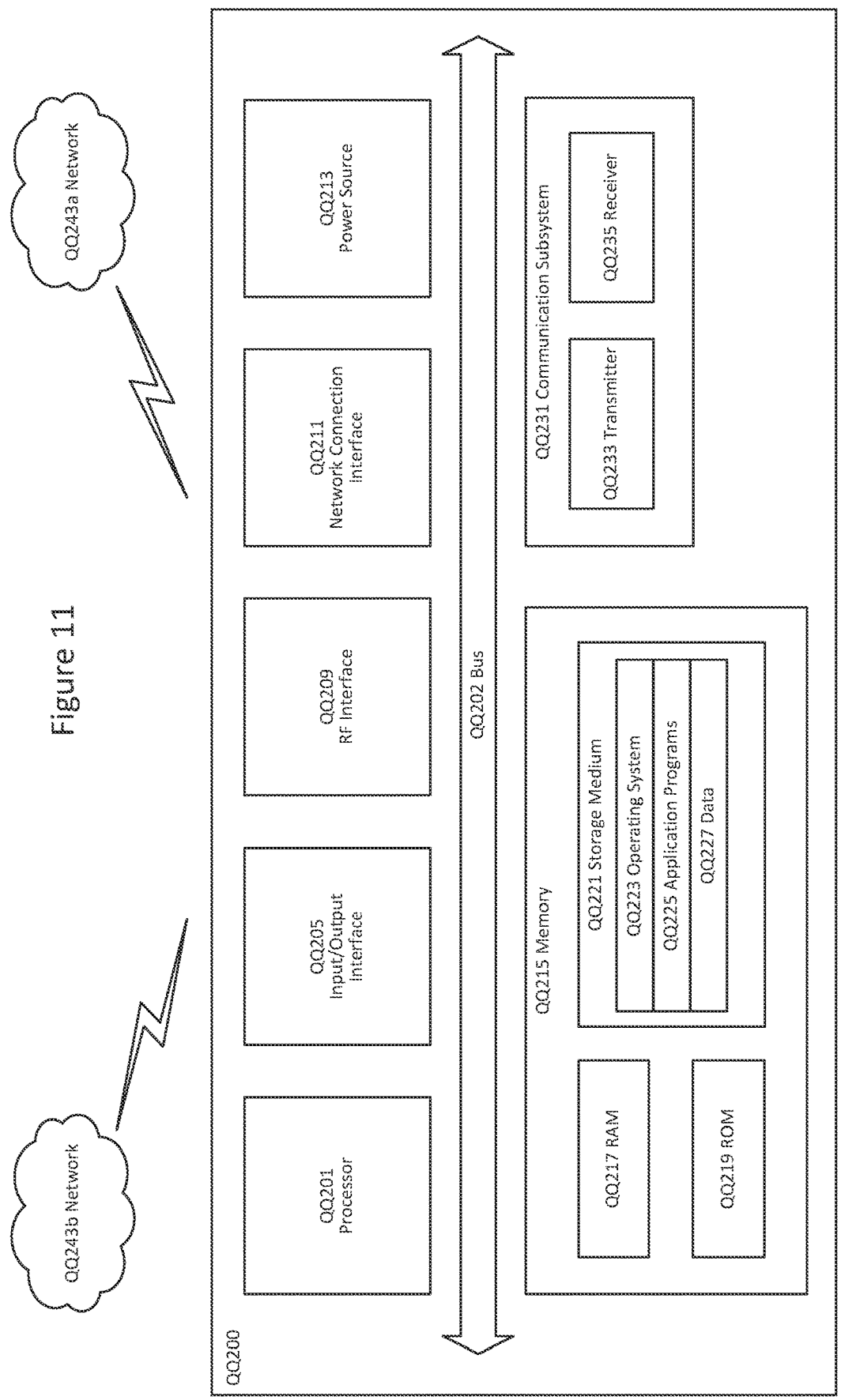
FIG. 11 is a block diagram of a user equipment in accordance with some embodiments

FIG. 11: User Equipment in accordance with some embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 12:
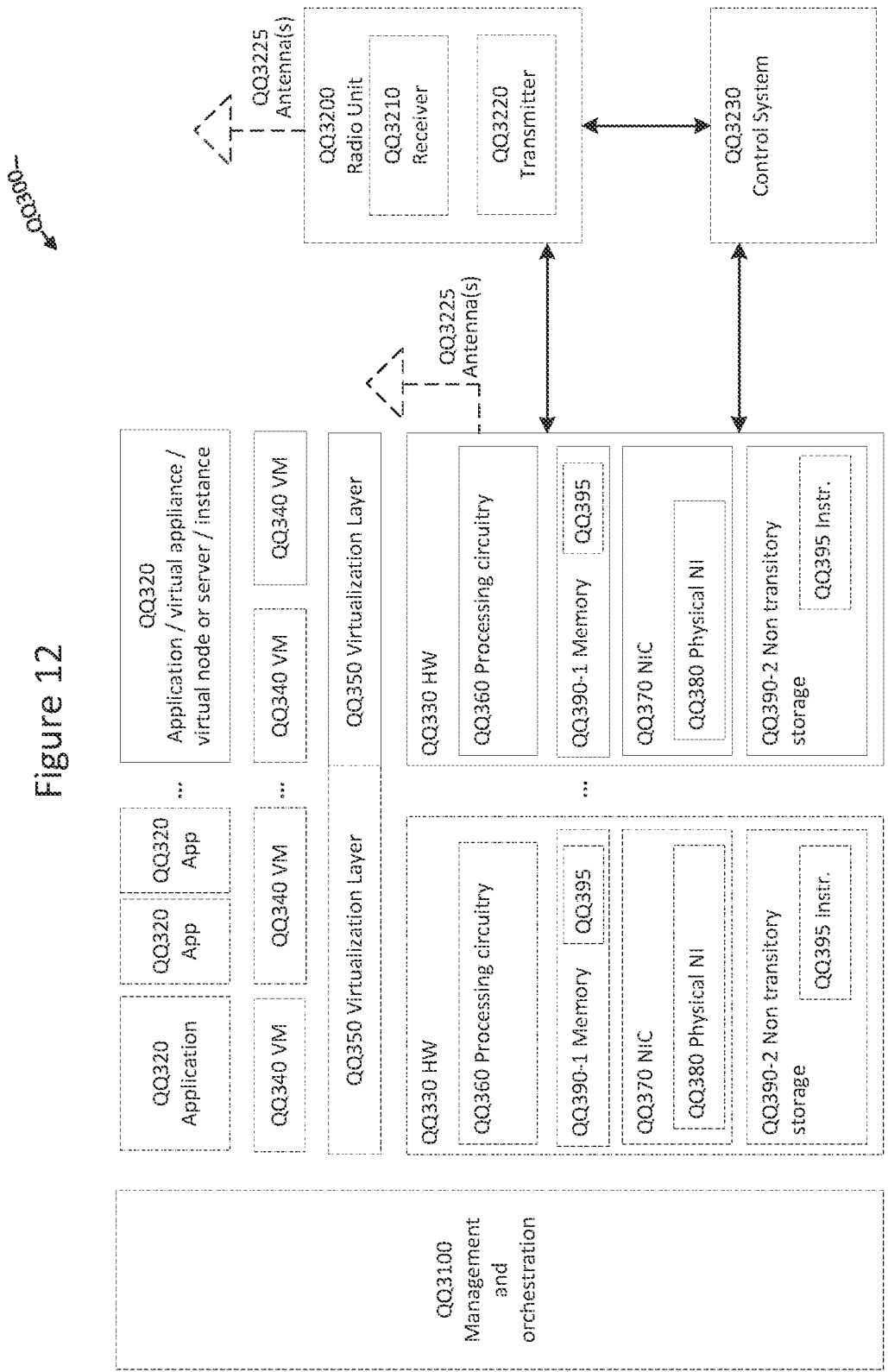
FIG. 12 is a block diagram of a virtualization environment in accordance with some embodiments.

FIG. 12: Virtualization environment in accordance with some embodiments

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 12.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 13:
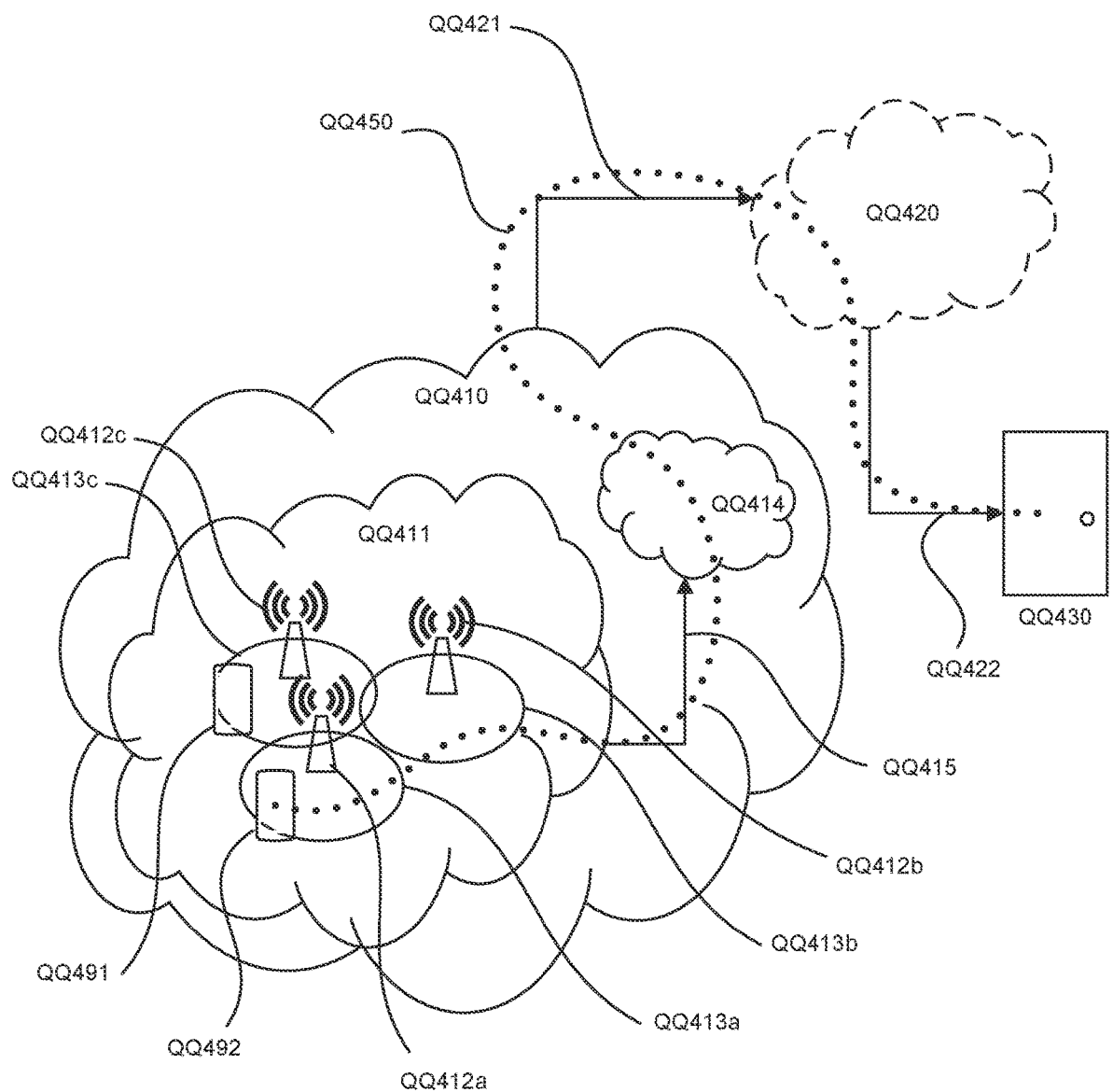
FIG. 13 is a block diagram of a telecommunication network connected via an intermediate network to a host computer in accordance with some embodiments.

FIG. 13: Telecommunication network connected via an intermediate network to a host computer in accordance with some embodiments With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 14:
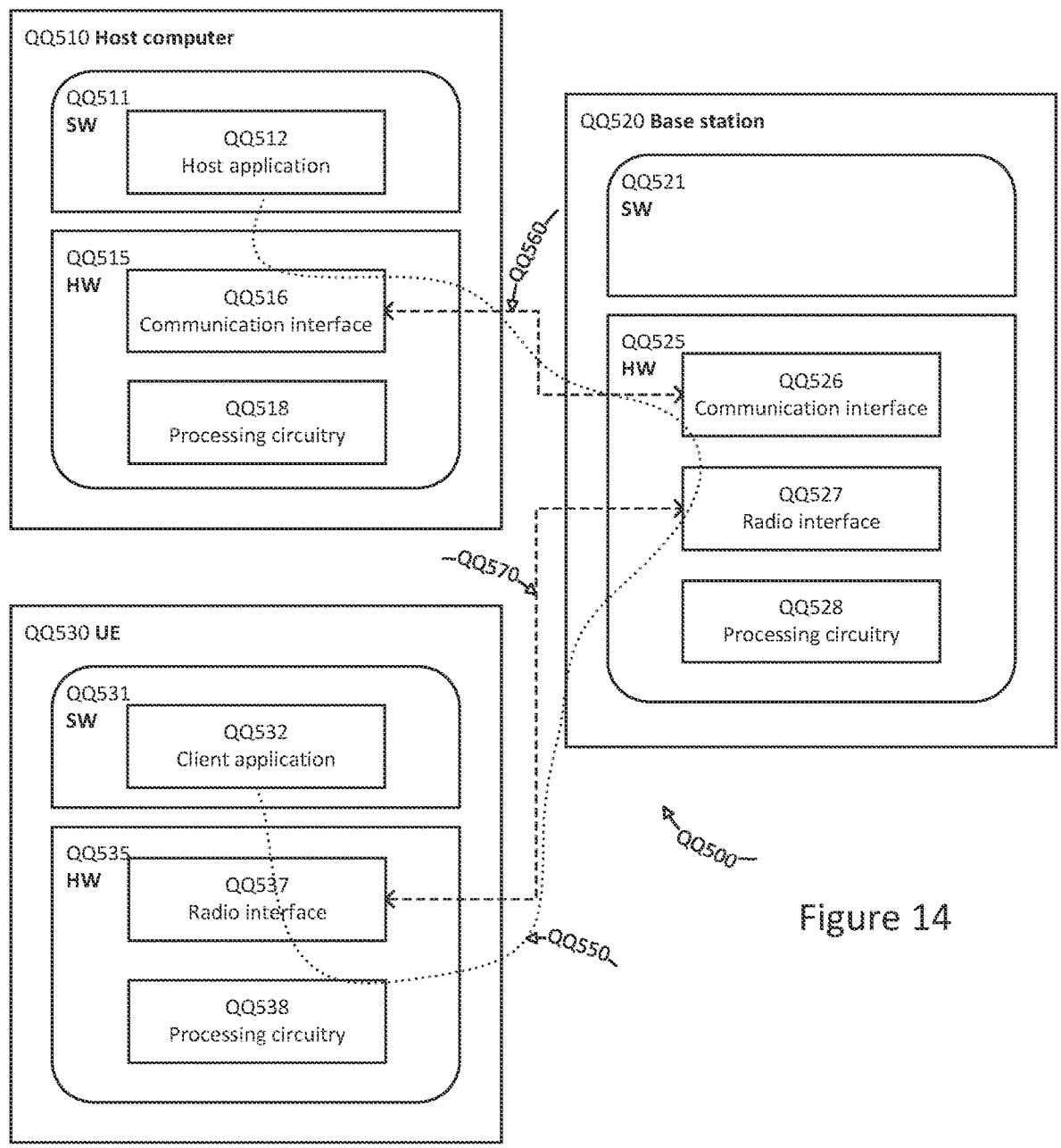
FIG. 14 is a block diagram of a host computer communicating via a base station with a user equipment over a partially wireless connection in accordance with some embodiments.

FIG. 14: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 15:
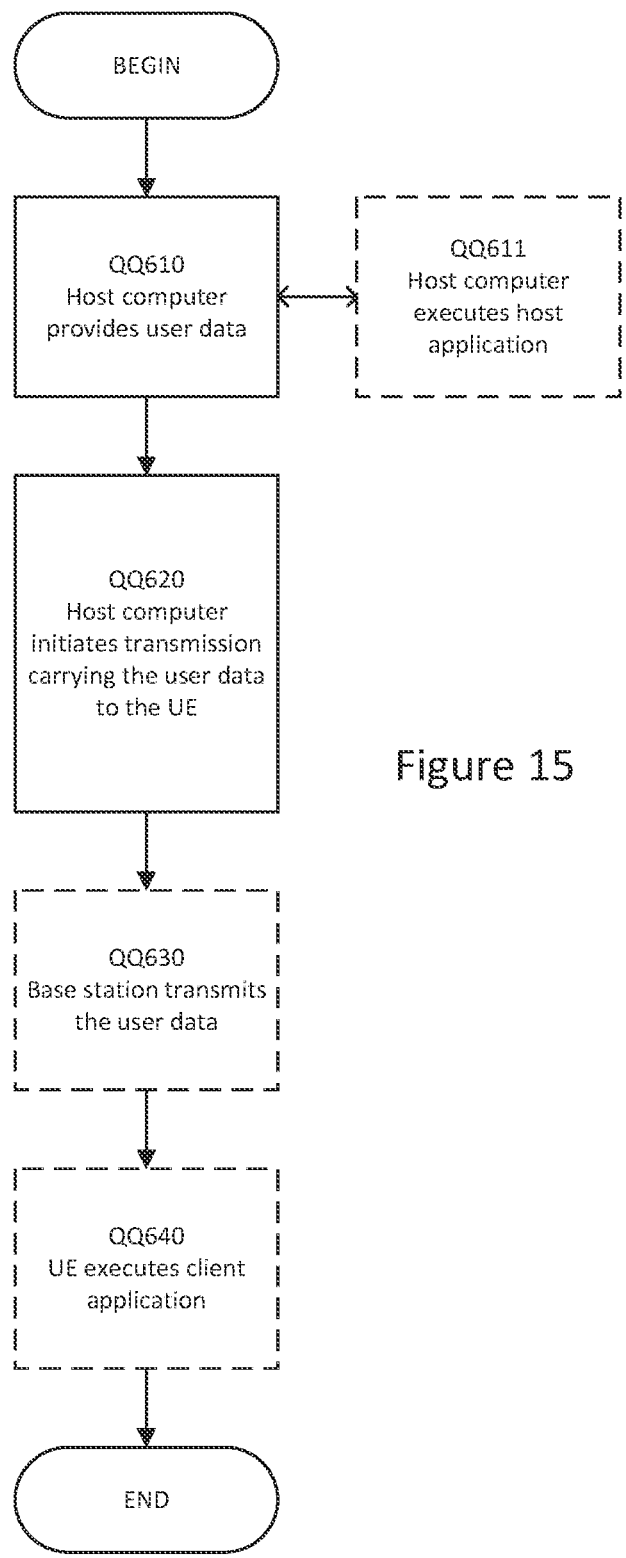
FIG. 15 is a block diagram of methods implemented in a communication system including a host computer, a base station and a user equipment in accordance with some embodiments.

FIG. 15: Methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 16:
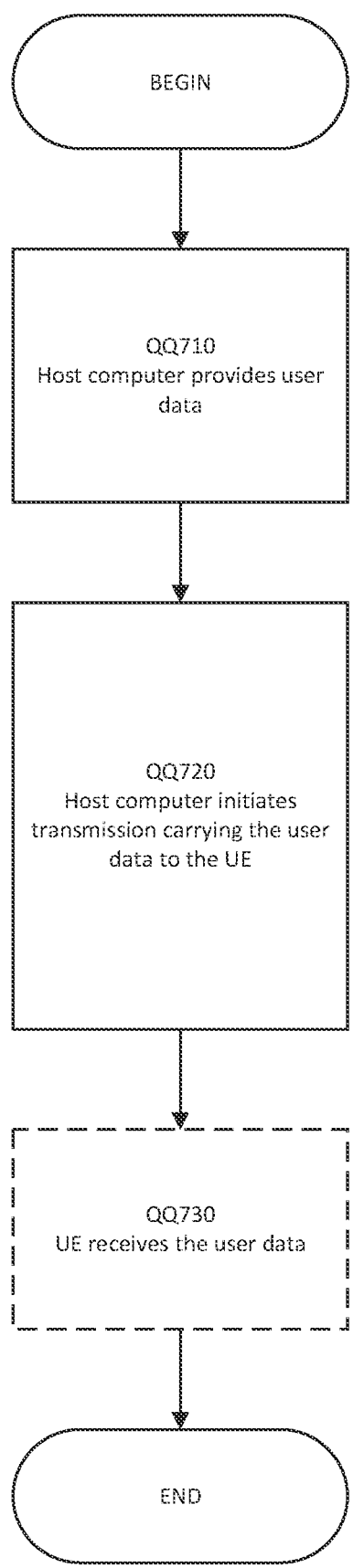
FIG. 16 is a block diagram of methods implemented in a communication system including a host computer, a base station and a user equipment in accordance with some embodiments.

FIG. 16: Methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 17:
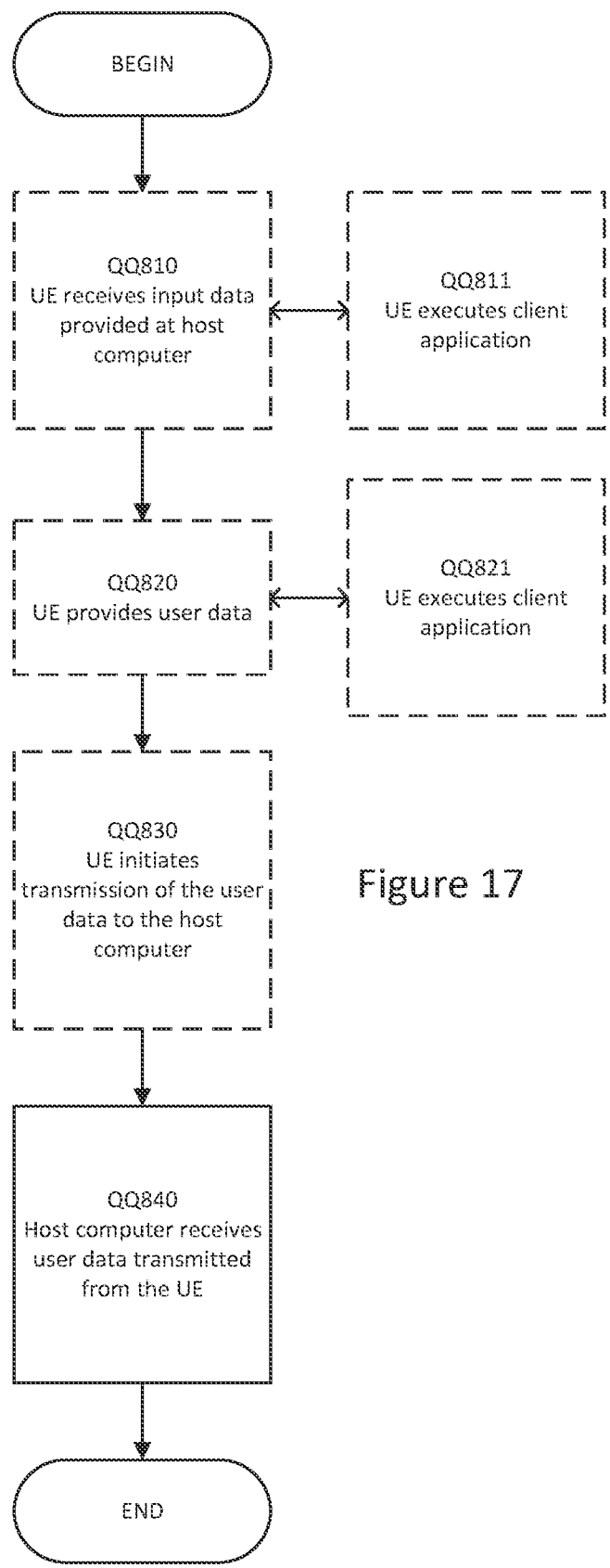
FIG. 17 is a block diagram of methods implemented in a communication system including a host computer, a base station and a user equipment in accordance with some embodiments.

FIG. 17: Methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 18:
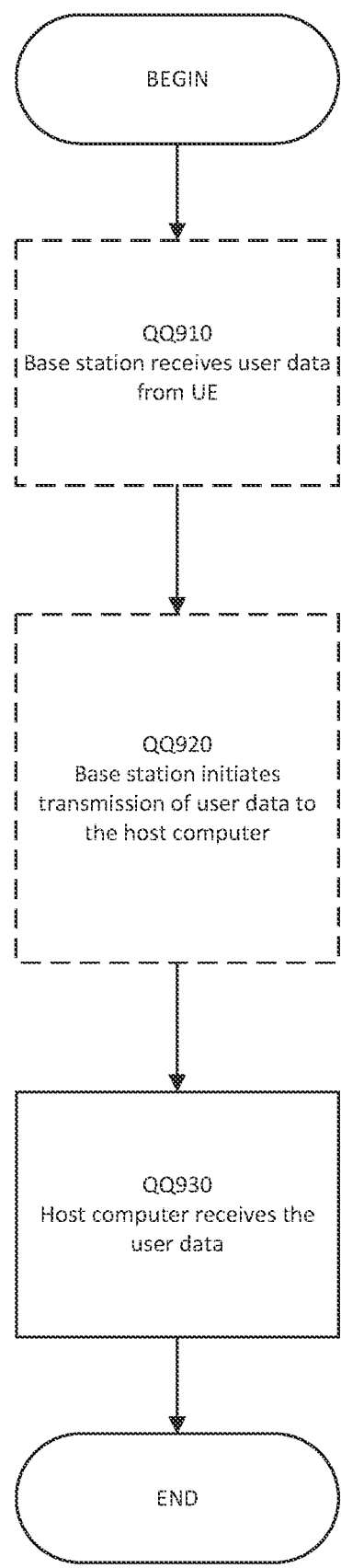
FIG. 18 is a block diagram of methods implemented in a communication system including a host computer, a base station and a user equipment in accordance with some embodiments.

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 19:
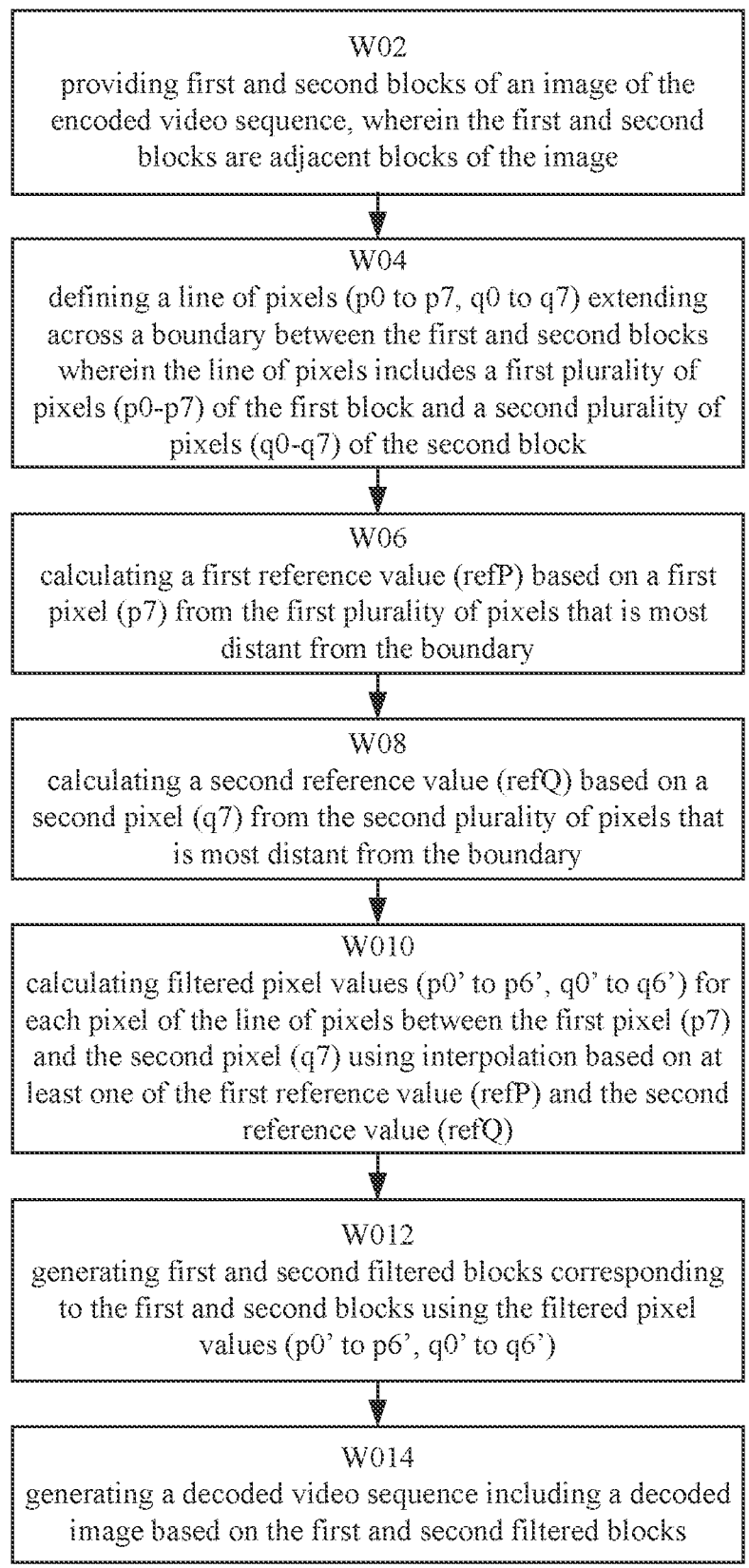
FIG. 19 is a diagram illustrating a method according to some embodiments.

FIG. 19 depicts a method in accordance with some embodiments of operating an electronic device (e.g., a UE) to decode an encoded video sequence including a plurality of images, with each image including a plurality of blocks. The method includes operation W02 of providing first and second blocks of an image of the encoded video sequence, with the first and second blocks being adjacent blocks of the image. The method includes operation W04 of defining a line of pixels extending across a boundary between the first and second blocks wherein the line of pixels includes a first plurality of pixels of the first block and a second plurality of pixels of the second block. The method includes operation W06 of calculating a first reference value based on a first pixel from the first plurality of pixels that is most distant from the boundary, and operation W08 of calculating a second reference value based on a second pixel from the second plurality of pixels that is most distant from the boundary. The method includes operation W010 of calculating filtered pixel values for each pixel of the line of pixels between the first pixel and the second pixel using interpolation based on at least one of the first reference value and the second reference value. The method includes operation W012 of generating first and second filtered blocks corresponding to the first and second blocks using the filtered pixel values. The method also include operation W014 of generating a decoded video sequence including a decoded image based on the first and second filtered blocks.

Figure 20:
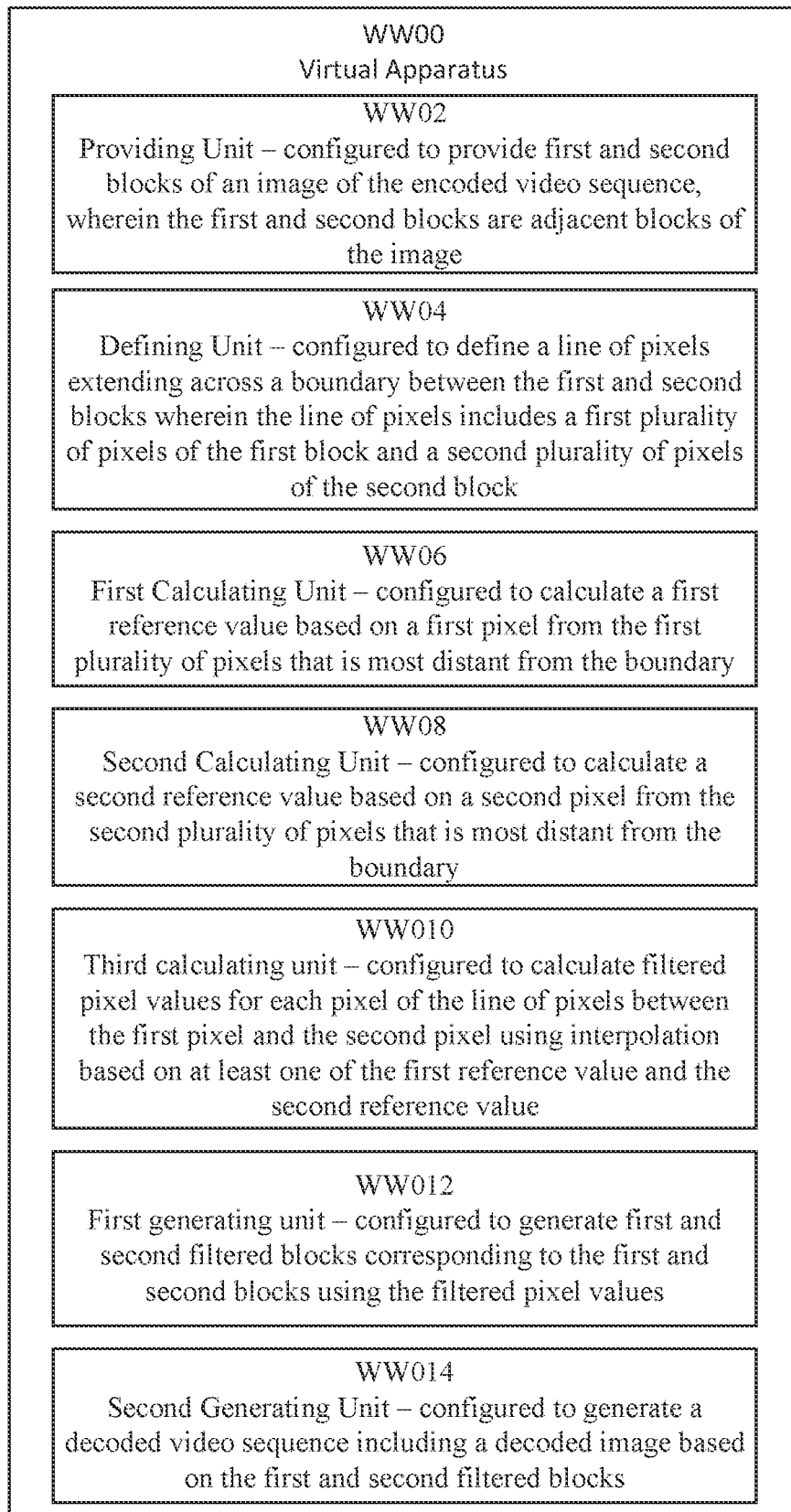
FIG. 20 is a schematic block diagram of an apparatus according to some embodiments.

FIG. 20 illustrates a schematic block diagram of an apparatus WW00 in a wireless network (for example, the wireless network shown in FIG. 10). The apparatus may be implemented in a wireless device or network node (e.g., wireless device QQ110 or network node QQ160 shown in FIG. 10). Apparatus WW00 is operable to carry out the example method described with reference to FIG. 19 and possibly any other processes or methods disclosed herein. It is also to be understood that the method of FIG. 19 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause providing unit WW02, defining unit WW04, first calculating unit WW06, second calculating unit WW08, third calculating unit WW010, first generating unit WW012, and second generating unit WW014 and any other suitable units of apparatus WW00 to perform corresponding functions according one or more embodiments of the present disclosure.

As illustrated in FIG. 20, providing unit WW02 is configured to provide first and second blocks of an image of the encoded video sequence, wherein the first and second blocks are adjacent blocks of the image. Defining unit WW04 is configured to define a line of pixels (p0 to p7, q0 to q7) extending across a boundary between the first and second blocks wherein the line of pixels includes a first plurality of pixels (p0-p7) of the first block and a second plurality of pixels (q0-q7) of the second block. First calculating unit WW06 is configured to calculate a first reference value (refP) based on a first pixel (p7) from the first plurality of pixels that is most distant from the boundary; second calculating unit WW08 is configured to calculate a second reference value (refQ) based on a second pixel (q7) from the second plurality of pixels that is most distant from the boundary; and third calculating unit WW010 is configured to calculate filtered pixel values (p0' to p6', q0' to q6') for each pixel of the line of pixels between the first pixel (p7) and the second pixel (q7) using interpolation based on at least one of the first reference value (refP) and the second reference value (refQ). First generating unit WW012 is configured to generate first and second filtered blocks corresponding to the first and second blocks using the filtered pixel values (p0' to p6', q0' to q6'); and second generating unit WW014 is configured to generate a decoded video sequence including a decoded image based on the first and second filtered blocks.

Figure 21:
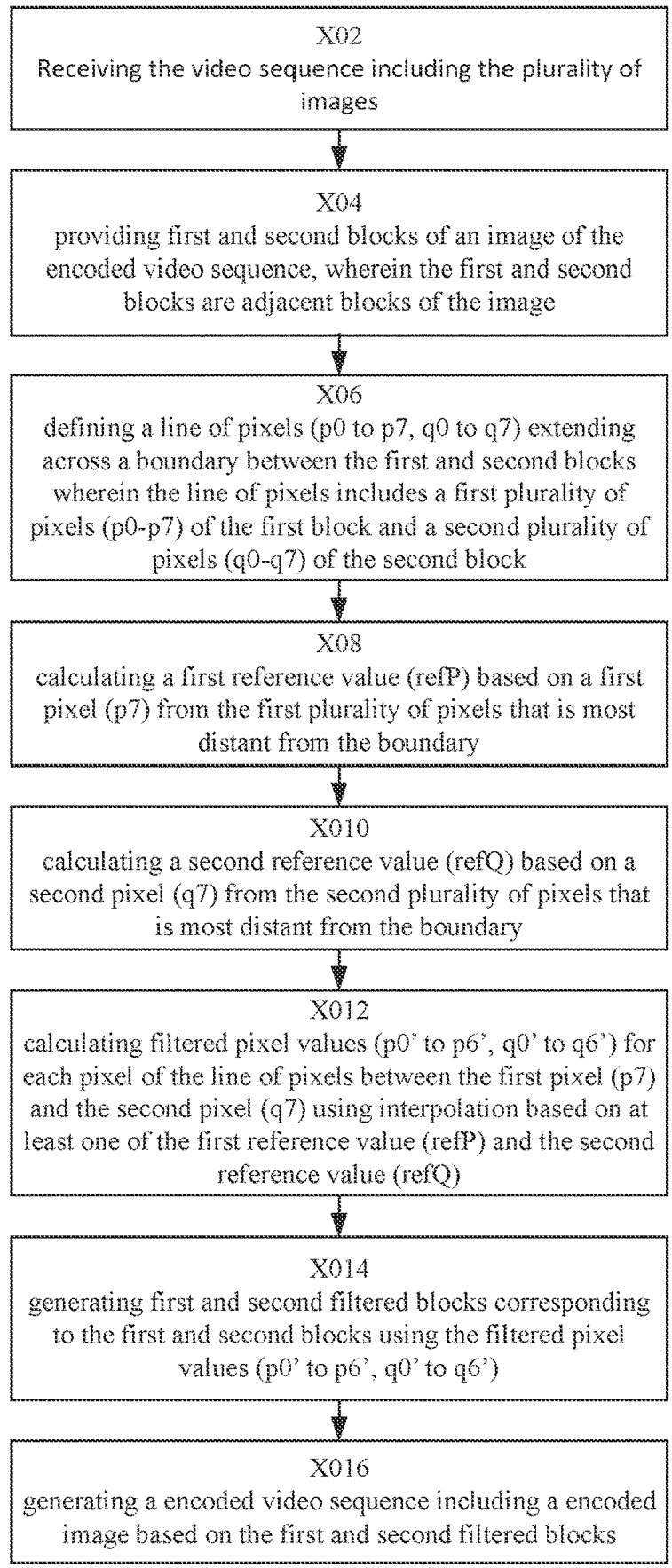
FIG. 21 is a diagram illustrating a method according to some embodiments.

FIG. 21 depicts a method in accordance with some embodiments of operating an electronic device (e.g., a UE) to encode an video sequence including a plurality of images, with each image including a plurality of blocks. The method includes operation X02 of receiving the video sequence including the plurality of images, and operation X04 of providing first and second blocks of an image of the video sequence, wherein the first and second blocks are adjacent blocks of the image. The method include operation X06 of defining a line of pixels (p0 to p7, q0 to q7) extending across a boundary between the first and second blocks wherein the line of pixels includes a first plurality of pixels (p0-p7) of the first block and a second plurality of pixels (q0-q7) of the second block. The method includes operation X08 of calculating a first reference value (refP) based on a first pixel (p7) from the first plurality of pixels that is most distant from the boundary; operation X010 of calculating a second reference value (refQ) based on a second pixel (q7) from the second plurality of pixels that is most distant from the boundary; and operation X012 of calculating filtered pixel values (p0' to p6', q0' to q6') for each pixel of the line of pixels between the first pixel and the second pixel using interpolation based on at least one of the first reference value (refP) and the second reference value (refQ). The method also includes operation X014 of generating first and second filtered blocks corresponding to the first and second blocks using the filtered pixel values (p0' to p6', q0' to q6'); and operation X016 of generating an encoded video sequence including an encoded image based on at least one of the first and second filtered blocks.

Figure 22:
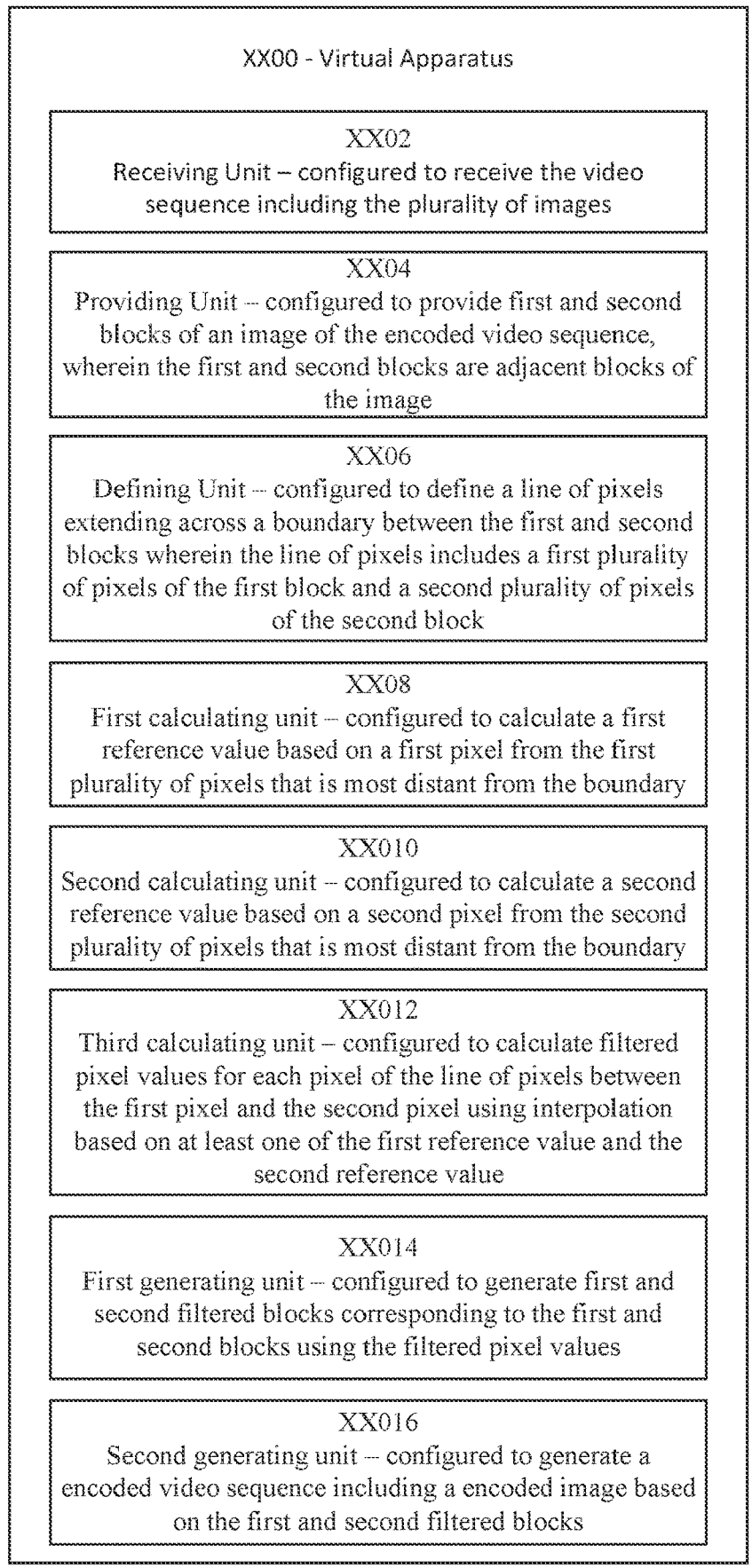
FIG. 22 is a schematic block diagram of an apparatus according to some embodiments.

FIG. 22 illustrates a schematic block diagram of an apparatus XX00 in a wireless network (for example, the wireless network shown in FIG. 10). The apparatus may be implemented in a wireless device or network node (e.g., wireless device QQ110 or network node QQ160 shown in FIG. 10). Apparatus XX00 is operable to carry out the example method described with reference to FIG. 21 and possibly any other processes or methods disclosed herein. It is also to be understood that the method of FIG. 21 is not necessarily carried out solely by apparatus XX00. At least some operations of the method can be performed by one or more other entities.

Virtual Apparatus XX00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit XX02, providing unit XX04, defining unit XX06, first calculating unit XX08, second calculating unit XX010, third calculating unit XX012, first generating unit XX014, and second generating unit XX016 and any other suitable units of apparatus XX00 to perform corresponding functions according one or more embodiments of the present disclosure.

As illustrated in FIG. 22, apparatus XX00 includes receiving unit XX02 configured to receive the video sequence including the plurality of images, and providing unit XX04 configured to provide first and second blocks of an image of the video sequence, wherein the first and second blocks are adjacent blocks of the image. Defining unit XX06 is configured to define a line of pixels (p0 to p7, q0 to q7) extending across a boundary between the first and second blocks wherein the line of pixels includes a first plurality of pixels (p0-p7) of the first block and a second plurality of pixels (q0-q7) of the second block. First calculating unit XX08 is configured to calculate a first reference value (refP) based on a first pixel (p7) from the first plurality of pixels that is most distant from the boundary; second calculating unit XX010 is configured to calculate a second reference value (refQ) based on a second pixel (q7) from the second plurality of pixels that is most distant from the boundary; and third calculating unit XX012 is configured to calculate filtered pixel values (p0' to p6', q0' to q6') for each pixel of the line of pixels between the first pixel and the second pixel using interpolation based on at least one of the first reference value (refP) and the second reference value (refQ). First generating unit XX014 is configured to generate first and second filtered blocks corresponding to the first and second blocks using the filtered pixel values (p0' to p6', q0' to q6'); and second generating unit XX016 is configured to generate an encoded video sequence including an encoded image based on at least one of the first and second filtered blocks.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
Further definitions are provided below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of decoding an encoded video sequence including a plurality of images, with each image of the plurality of images including a plurality of blocks, the method comprising:
    providing first and second blocks of an image of the encoded video sequence, wherein the first and second blocks are adjacent blocks of the image;
    defining a line of pixels extending across a boundary between the first and second blocks based on two-dimensional coordinates of the pixels, wherein the line of pixels includes a first plurality of pixels of the first block and a second plurality of pixels of the second block;
    calculating a first reference value based on a first pixel from the first plurality of pixels that is most distant from the boundary;
    calculating a second reference value based on a second pixel from the second plurality of pixels that is most distant from the boundary;

calculating a third reference value based on a third pixel and a fourth pixel from the line of pixels, wherein the third pixel is in the line between the first pixel and the fourth pixel, and wherein the fourth pixel is in the line between the third pixel and the second pixel, wherein the third pixel and the fourth pixel are closest to the boundary and wherein the third reference value is on the boundary;

calculating filtered pixel values for each pixel of the line of pixels between the first pixel and the second pixel using interpolation based on at least one of the first reference value and the second reference value, wherein calculating the filtered pixel values for the pixels between the first reference value and the third reference value is based on interpolation between the first reference value and the third reference value using a first filter comprising filter coefficients that are associated with the pixels positioned between the first reference value and the third reference value, and calculating the filtered pixel values for the pixels between the second reference value and the third reference value is based on interpolation between the second reference value and the third reference value using a second filter comprising filter coefficients that are associated with the pixels positioned between the second reference value and the third reference value;

generating first and second filtered blocks corresponding to the first and second blocks using the filtered pixel values; and generating a decoded video sequence including a decoded image based on the first and second filtered blocks.

2. The method of claim 1, wherein calculating the third reference value comprises calculating the third reference value as an average based on a value of the third pixel and a value of the fourth pixel.

3. The method of claim 1, wherein calculating the first reference value comprises calculating the first reference value as an average based on a value of the first pixel and a value of a pixel of the line adjacent the first pixel, and wherein calculating the second reference value comprises calculating the second reference value as an average based on a value of the second pixel and a value of a pixel of the line adjacent the second pixel.

4. The method of claim 1, wherein the first and second pluralities of pixels include an equal number of pixels.

5. The method of claim 1, wherein the first and second pluralities of pixels include different numbers of pixels.

6. The method of claim 1, wherein the first plurality of pixels ("px") comprises pixels p0, p1, p2, p3, p4, and p5, wherein the second plurality of pixels ("qx") comprises pixels q0, q1, q2, q3, q4, and q5, wherein the first reference value ("refP"), the second reference value ("refQ"), and the third reference value ("refMiddle") are obtained as refP=(p5+p4+1)>>1, refQ=(q5+q4+1)>>1 and refMiddle=((p4+p3+2*(p2+p1+p0+q0+q1+q2)+q3+q4)+8)>>4 and wherein the filtered values are calculated as:

$$p(x)=(f\mathrm{Int}(x)*\mathrm{refMiddle}+(64-f\mathrm{Int}(x))*\mathrm{ref}P+32)>>6;$$
and $$q(x)=(f\mathrm{Int}(x)*\mathrm{refMiddle}+(64-f\mathrm{Int}(x))*\mathrm{ref}Q+32)>>6,$$
and wherein fInt(0) is equal to 58, fInt(1) is equal to 45, fInt(2) is equal to 32, fInt(3) is equal to 19 and fInt(4) is equal to 6, p(x) is a filtered version of px and q(x) is a filtered version of qx, where x ranges from 0 to 4.

7. The method of claim 1, wherein the first plurality of pixels ("px") comprises pixels p0, p1, p2, p3, p4, p5, p6, and p7, wherein the second plurality of pixels ("qx") comprises pixels q0, q1, q2, q3, q4, q5, q6, and q7, wherein the first reference value ("refP"), the second reference value ("refQ"), and the third reference value ("refMiddle") are obtained as refP=(p7+p6+1)>>1, refQ=(q7+q6+1)>>1 and refMiddle=((p6+p5+p4+p3+p2+p1+2*(p0+q0)+q1+q2+q3+q4+q5+q6)+8)>>4 and wherein the filtered values are calculated as:

$$p(x)=(f\mathrm{Int}(x)*\mathrm{refMiddle}+(64-f\mathrm{Int}(x))*\mathrm{ref}P+32)>>6;$$
and $$q(x)=(f\mathrm{Int}(x)*\mathrm{refMiddle}+(64-f\mathrm{Int}(x))*\mathrm{ref}Q+32)>>6,$$
and wherein fInt(0) is equal to 59, fInt(1) is equal to 50, fInt(2) is equal to 41, fInt(3) is equal to 32, fInt(4) is equal to 23, fInt(5) is equal to 14 and fInt(6) is equal to 5, p(x) is a filtered version of px and q(x) is a filtered version of qx, where x ranges from 0 to 6.

8. A method of encoding a video sequence including a plurality of images, with each image of the plurality of images including a plurality of blocks, the method comprising:

receiving the video sequence including the plurality of images;

providing first and second blocks of an image of the video sequence, wherein the first and second blocks are adjacent blocks of the image;

defining a line of pixels extending across a boundary between the first and second blocks wherein the line of pixels includes a first plurality of pixels of the first block and a second plurality of pixels of the second block;

calculating a first reference value based on a first pixel from the first plurality of pixels that is most distant from the boundary;

calculating a second reference value based on a second pixel from the second plurality of pixels that is most distant from the boundary;

calculating a third reference value based on a third pixel and a fourth pixel from the line of pixels, wherein the third pixel is in the line between the first pixel and the fourth pixel, and wherein the fourth pixel is in the line between the third pixel and the second pixel, wherein the third pixel and the fourth pixel are closest to the boundary and wherein the third reference value is on the boundary;

subsequent to defining the line of pixels, calculating filtered pixel values for each pixel of the line of pixels between the first pixel and the second pixel using interpolation based on at least one of the first reference value and the second reference value, wherein calculating the filtered pixel values for the pixels between the first reference value and the third reference value is based on interpolation between the first reference value and the third reference value using a first filter comprising filter coefficients that are associated with the pixels positioned between the first reference value and the third reference value, and calculating the filtered pixel values for the pixels between the second reference value and the third reference value is based on interpolation between the second reference value and the third reference value using a second filter comprising filter coefficients that are associated with the pixels positioned between the second reference value and the third reference value;

generating first and second filtered blocks corresponding to the first and second blocks using the filtered pixel values; and generating an encoded video sequence including an encoded image based on at least one of the first and second filtered blocks.

9. The method of claim 8, wherein calculating the third reference value comprises calculating the third reference value as an average based on a value of the third pixel and a value of the fourth pixel.

10. The method of claim 8, wherein the first and second pluralities of pixels include an equal number of pixels.

11. The method of claim 8, wherein the first and second pluralities of pixels include different numbers of pixels.

12. The method of claim 8, wherein the first plurality of pixels ("px") comprises pixels p0, p1, p2, p3, p4, and p5,
wherein the second plurality of pixels ("qx") comprises pixels q0, q1, q2, q3, q4, and q5,
wherein the first reference value ("refP"), the second reference value ("refQ"), and the third reference value ("refMiddle") are obtained as refP=(p5+p4+1)>>1, refQ=(q5+q4+1)>>1 and refMiddle=((p4+p3+2*(p2+p1+p0+q0+q1+q2)+q3+q4)+8)>>4 and wherein the filtered values are calculated as:

$p(x) = (fInt(x)*refMiddle+(64-fInt(x))*refP+32)>>6;$
and $q(x) = (fInt(x)*refMiddle+(64-fInt(x))*refQ+32)>>6,$
and wherein fInt(0) is equal to 58, fInt(1) is equal to 45, fInt(2) is equal to 32, fInt(3) is equal to 19 and fInt(4) is equal to 6, p(x) is a filtered version of px and q(x) is a filtered version of qx, where x ranges from 0 to 4.

13. The method of claim 8, wherein the first plurality of pixels ("px") comprises pixels p0, p1, p2, p3, p4, p5, p6, and p7,
wherein the second plurality of pixels ("qx") comprises pixels q0, q1, q2, q3, q4, q5, q6, and q7,
wherein the first reference value ("refP"), the second reference value ("refQ"), and the third reference value ("refMiddle") are obtained as refP=(p7+p6+1)>>1, refQ=(q7+q6+1)>>1 and refMiddle=((p6+p5+p4+p3+p2+p1+2*(p0+q0)+q1+q2+q3+q4+q5+q6)+8)>>4 and wherein the filtered values are calculated as:

$p(x) = (fInt(x)*refMiddle+(64-fInt(x))*refP+32)>>6;$
and $q(x) = (fInt(x)*refMiddle+(64-fInt(x))*refQ+32)>>6,$
and wherein fInt(0) is equal to 59, fInt(1) is equal to 50, fInt(2) is equal to 41, fInt(3) is equal to 32, fInt(4) is equal to 23, fInt(5) is equal to 14 and fInt(6) is equal to 5, p(x) is a filtered version of px and q(x) is a filtered version of qx, where x ranges from 0 to 6.

14. An electronic device adapted to decode an encoded video sequence including a plurality of images, with each image of the plurality of images including a plurality of blocks, the electronic device comprising:
a processor; and
memory coupled with the processor and including instructions stored therein that are executable by the processor to cause the electronic device to perform operations comprising:

providing first and second blocks of an image of the encoded video sequence, wherein the first and second blocks are adjacent blocks of the image, defining a line of pixels extending across a boundary between the first and second blocks based on two-dimensional coordinates of the pixels, wherein the line of pixels includes a first plurality of pixels of the first block and a second plurality of pixels of the second block, calculating a first reference value based on a first pixel from the first plurality of pixels that is most distant from the boundary, calculating a second reference value based on a second pixel from the second plurality of pixels that is most distant from the boundary, calculating a third reference value based on a third pixel and a fourth pixel from the line of pixels, wherein the third pixel is in the line between the first pixel and the fourth pixel, and wherein the fourth pixel is in the line between the third pixel and the second pixel, wherein the third pixel and the fourth pixel are closest to the boundary and wherein the third reference value is on the boundary, calculating filtered pixel values for each pixel of the line of pixels between the first pixel and the second pixel using interpolation based on at least one of the first reference value and the second reference value, wherein calculating the filtered pixel values for the pixels between the first reference value and the third reference value is based on interpolation between the first reference value and the third reference value using a first filter comprising filter coefficients that are associated with the pixels positioned between the first reference value and the third reference value, and calculating the filtered pixel values for the pixels between the second reference value and the third reference value is based on interpolation between the second reference value and the third reference value using a second filter comprising filter coefficients that are associated with the pixels positioned between the second reference value and the third reference value, generating first and second filtered blocks corresponding to the first and second blocks using the filtered pixel values, and generating a decoded video sequence including a decoded image based on the first and second filtered blocks.

15. The electronic device of claim 14, wherein calculating the third reference value comprises calculating the third reference value as an average based on a value of the third pixel and a value of the fourth pixel.

16. An electronic device adapted to encode a video sequence including a plurality of images, with each image of the plurality of images including a plurality of blocks, the electronic device comprising:
a processor; and
memory coupled with the processor and including instructions stored therein that are executable by the processor to cause the electronic device to perform operations comprising:
receiving the video sequence including the plurality of images,
providing first and second blocks of an image of the video sequence, wherein the first and second blocks are adjacent blocks of the image, subsequent to defining a line of pixels, defining a line of pixels extending across a boundary between the first and second blocks wherein the line of pixels includes a first plurality of pixels of the first block and a second plurality of pixels of the second block, calculating a first reference value based on a first pixel from the first plurality of pixels that is most distant from the boundary, calculating a second reference value based on a second pixel from the second plurality of pixels that is most distant from the boundary, calculating a third reference value based on a third pixel and a fourth pixel from the line of pixels, wherein the third pixel is in the line between the first pixel and the fourth pixel, and wherein the fourth pixel is in the line between the third pixel and the second pixel, wherein the third pixel and the fourth pixel are closest to the boundary and wherein the third reference value is on the boundary, calculating filtered pixel values for each pixel of the line of pixels between the first pixel and the second pixel using interpolation based on at least one of the first reference value and the second reference value, wherein calculating the filtered pixel values for the pixels between the first reference value and the third reference value is based on interpolation between the first reference value and the third reference value using a first filter comprising filter coefficients that are associated with the pixels positioned between the first reference value and the third reference value, and calculating the filtered pixel values for the pixels between the second reference value and the third reference value is based on interpolation between the second reference value and the third reference value using a second filter comprising filter coefficients that are associated with the pixels positioned between the second reference value and the third reference value, generating first and second filtered blocks corresponding to the first and second blocks using the filtered pixel values, and generating an encoded video sequence including an encoded image based on at least one of the first and second filtered blocks.

17. The electronic device of claim 16, wherein calculating the third reference value comprises calculating the third reference value as an average based on a value of the third pixel and a value of the fourth pixel.

18. The method of claim 1, wherein calculating the filtered pixel values comprises, subsequent to defining the line of pixels, calculating the filtered pixel values for each pixel of the line of pixels between the first pixel and the second pixel using interpolation based on at least one of the first reference value and the second reference value.

19. The method of claim 8, wherein defining the line of pixels comprises defining the line of pixels extending across a boundary between the first and second blocks based on two-dimensional coordinates of the pixels.

20. The electronic device of claim 16, wherein defining the line of pixels comprises defining the line of pixels extending across a boundary between the first and second blocks based on two-dimensional coordinates of the pixels.

* * * * *

UNITED STATES PATENT AND TRADEMARK OFFICE
CERTIFICATE OF CORRECTION

PATENT NO. : 11,889,054 B2
APPLICATION NO. : 16/959377
DATED : January 30, 2024
INVENTOR(S) : Andersson et al.

It is certified that error appears in the above-identified patent and that said Letters Patent is hereby corrected as shown below:

On the Title Page

On Page 2, in Item (56), under "OTHER PUBLICATIONS", in Column 2, Line 23, delete "Ket al:" and insert -- K et al: --, therefor.

In the Specification

In Column 1, below Title, insert -- CROSS-REFERENCE TO RELATED APPLICATION
This application is a 35 U.S.C. § 371 national stage application of PCT International Application No. PCT/EP2018/084990 filed on December 14, 2018, which in turns claims domestic priority to U.S. Provisional Patent Application No. 62/611,852, filed on December 29, 2017, the disclosures and content of which are incorporated by reference herein in their entirety. --.

In Column 1, Line 48, delete "previous" and insert -- previously --, therefor.

In Column 1, Line 49, delete "previous" and insert -- previously --, therefor.

In Column 7, Line 50, delete "form" and insert -- from --, therefor.

In Column 8, Line 66, delete "not the" and insert -- not within the --, therefor.

In Column 10, Line 27, delete "f=[4.53.52.51.50.5]/5" and insert -- f = [4.5 3.5 2.5 1.5 0.5]/5 --, therefor.

In Column 11, Line 27, delete "10" and insert -- 1 0 --, therefor.

In Column 12, Line 5, delete "provide" and insert -- provided --, therefor.

In Column 16, Line 53, delete "though" and insert -- through --, therefor.

Signed and Sealed this
Twenty-eighth Day of May, 2024

Katherine Kelly Vidal
*Director of the United States Patent and Trademark Office*

CERTIFICATE OF CORRECTION (continued)
U.S. Pat. No. 11,889,054 B2

In Column 32, Line 67, delete "interchangeable." and insert -- interchangeably. --, therefor.

In Column 34, Line 43, delete "high-density" and insert -- high-definition --, therefor.

In Column 34, Line 50, delete "(SIM/RUIM) module," and insert -- module (SIM/RUIM), --, therefor.

In Column 35, Line 4, delete "802.QQ2," and insert -- 802.11, --, therefor.

In Column 42, Line 13, delete "WO4" and insert -- W04 --, therefor.

In Column 42, Line 18, delete "WO6" and insert -- W06 --, therefor.

In Column 42, Line 20, delete "WO8" and insert -- W08 --, therefor.

In Column 42, Line 23, delete "WO1O" and insert -- W010 --, therefor.

In Column 44, Line 20, delete "according" and insert -- according to --, therefor.

In Column 45, Line 14, delete "information" and insert -- Indicator --, therefor.

In Column 46, Line 2, delete "Profile" and insert -- Power --, therefor.

In Column 46, Line 4, delete "Packet Gateway" and insert -- Packet Data Network Gateway --, therefor.

In Column 46, Line 53, delete "Wide" and insert -- Wideband --, therefor.

In Column 46, Line 54, delete "Wide" and insert -- Wireless --, therefor.